(12) United States Patent
Price et al.

(10) Patent No.: US 8,747,928 B2
(45) Date of Patent: Jun. 10, 2014

(54) FROZEN FOOD ITEM HOLDER

(76) Inventors: Mecinna Price, Chubbuck, ID (US);
Jared Price, Chubbuck, ID (US)

(*) Notice: Subject to any disclaimer, the term of this patent is extended or adjusted under 35 U.S.C. 154(b) by 36 days.

(21) Appl. No.: 13/026,044

(22) Filed: Feb. 11, 2011

(65) Prior Publication Data

US 2012/0205382 A1     Aug. 16, 2012

(51) Int. Cl.
*A23L 1/00* (2006.01)

(52) U.S. Cl.
USPC ........... 426/134; 426/132; 426/106; 426/115; 249/92; 249/121

(58) Field of Classification Search
USPC ................. 426/134.132, 106, 115; 220/574; 248/311.3; 249/92, 121
See application file for complete search history.

(56) References Cited

U.S. PATENT DOCUMENTS

| | | | |
|---|---|---|---|
| 1,528 A | 3/1840 | Church | |
| 1,800,759 A | 4/1931 | Shean | |
| 1,829,664 A | 10/1931 | McKay | |
| 1,920,995 A | 8/1933 | Legge | |
| 2,162,224 A | 1/1938 | Legge | |
| 2,321,519 A | 6/1943 | Rubinoff | |
| 2,766,123 A | 7/1954 | Moubayed | |
| 2,834,685 A | 9/1954 | Ferguson | |
| 2,948,452 A | 12/1957 | Grogan | |
| 2,946,207 A * | 7/1960 | Hulterstrum | 249/92 |
| D188,992 S * | 10/1960 | Morrison | D7/672 |
| 2,980,039 A | 4/1961 | Jolly | |
| 3,109,596 A | 11/1963 | Chernansky | |
| 3,306,512 A | 2/1967 | Pagnini | |
| 3,459,296 A | 8/1969 | Berg | |
| 3,729,157 A | 4/1973 | Haff | |
| 4,069,996 A | 1/1978 | Koziol | |
| 4,236,175 A * | 11/1980 | Groothuis | 348/659 |

(Continued)

FOREIGN PATENT DOCUMENTS

| GB | 3238366 A | 2/1999 |
|---|---|---|
| WO | 2007076009 A2 | 7/2007 |

OTHER PUBLICATIONS

Judicael Cornu, product designer, tupperware, Lollitup set, [on line] May 31, 2010, retriieved Feb. 7, 2013. Retrieved from the Internet: URL: <http://www.coroflot.com/judicael/tupperware>.*

(Continued)

*Primary Examiner* — Rena L Dye
*Assistant Examiner* — Chaim Smith
(74) *Attorney, Agent, or Firm* — Bryan Cave LLP

(57) ABSTRACT

The present invention relates to a holder for frozen food items and confections. The holder includes a grippable shaft having a first receptacle at a first end of the shaft and a second receptacle at a second end of the shaft. The first receptacle is adapted to receive a cone, such as those served with ice cream, or other frozen confection. The second receptacle is adapted to receive a stick, such as those served with frozen ice confections and ice cream bars. The receptacles are further adapted to receive drippage from melting frozen food items and confections. Furthermore, the holder is invertible to conveniently use either the first or second receptacle for receiving frozen food items supported in a cone, or on a stick. The receptacle not in use may be used as a support member to place the holder on a table or similar flat surface, if desired. The holder also includes a mounting cap that attaches to the holder for preparation and consumption of a frozen food item.

15 Claims, 27 Drawing Sheets

(56) References Cited

U.S. PATENT DOCUMENTS

| | | | |
|---|---|---|---|
| 4,290,573 A | | 9/1981 | Shapiro |
| 4,378,025 A | * | 3/1983 | Gaston .......................... 424/401 |
| 4,894,008 A | | 1/1990 | Lee |
| 4,992,283 A | | 2/1991 | Shorey |
| 5,224,646 A | | 7/1993 | Biancosino |
| 5,354,191 A | * | 10/1994 | Bobis ............................ 425/118 |
| 5,447,348 A | * | 9/1995 | Lapierre ........................ 294/219 |
| 5,515,998 A | | 5/1996 | Wang |
| 5,660,866 A | | 8/1997 | Tomioka et al. |
| 5,946,773 A | * | 9/1999 | Esker et al. ..................... 16/422 |
| 5,971,829 A | | 10/1999 | Hartman |
| 5,979,695 A | | 11/1999 | Valls et al. |
| 6,032,825 A | | 3/2000 | Guthrie |
| 6,048,014 A | | 4/2000 | Stefanik |
| D426,047 S | | 6/2000 | Kurtz et al. |
| D426,367 S | | 6/2000 | Gale |
| 6,182,854 B1 | | 2/2001 | Jimenez et al. |
| 6,190,226 B1 | * | 2/2001 | Conconi .......................... 446/73 |
| 6,202,970 B1 | | 3/2001 | Dunbar |
| 6,230,764 B1 | | 5/2001 | Rodman |
| 6,237,646 B1 | | 5/2001 | Rodman |
| 6,375,236 B1 | | 4/2002 | Ducharme |
| 6,941,982 B1 | | 9/2005 | Swan et al. |
| 7,036,776 B1 | | 5/2006 | Armstrong |
| 2001/0017299 A1 | | 8/2001 | Schmarr |
| 2002/0029697 A1 | | 3/2002 | Oshio |
| 2002/0247716 | | 10/2005 | Larimer et al. |
| 2006/0127542 A1 | | 6/2006 | Wachtel et al. |
| 2007/0114235 A1 | | 5/2007 | Neasham et al. |
| 2007/0148296 A1 | | 6/2007 | Price et al. |
| 2009/0011106 A1 | | 1/2009 | Givati et al. |
| 2009/0068324 A1 | | 3/2009 | Sandoval |
| 2009/0175991 A1 | | 7/2009 | Takeuchi |
| 2013/0011530 A1 | * | 1/2013 | Wolf et al. ..................... 426/241 |
| 2013/0011531 A1 | * | 1/2013 | Wolf ............................. 426/241 |

OTHER PUBLICATIONS

Tupperware-Lollitups-ICE-TUPS-Popsicle-eBay, [on line] retrieved on Feb. 7, 2012. Retrieved from the Internet: URL:<http://www.ebay.com/itm/Tupperware-Lollitups-ICE-TUPS-Popsicle-Treat-Frozen-Fruit-Juice-Koolaid-NEW-/121063141274?pt=LH_DefaultDomain_0&hash=item1c2fecef9a>.*
International Search Report for PCT/US06/49010 dated Sep. 25, 2007.

* cited by examiner

FROZEN FOOD ITEM HOLDER

FIELD OF THE INVENTION

The present invention generally relates to a grippable food item holder for frozen food items or frozen confections, having two cup-like receptacles for receiving drippage from melting food products, and also having an attachment for making and supporting a meltable food product.

BACKGROUND OF THE INVENTION

Typically, when a frozen food item is being consumed, such as ice cream, frozen yogurt, snow cones and/or frozen confection foods, the food item melts, creating drippage. Sometimes, frozen food items are consumed while in a bowl, in which case the drippage may be readily managed. More frequently, however, these frozen food items, or frozen confections, are consumed while lodged atop an edible cone, or held on a stick, wherein the drippage becomes more difficult to manage during consumption. Both children and adults alike are susceptible to having drippage land on their clothing, skin and the like, creating a nuisance for the consumer.

Attempts to manage the drippage of melting frozen food items have been made in the prior art. A drip catching plate is disclosed in U.S. Pat. No. 2,321,519, providing a plate for receiving an ice cream cone. This invention is not a freestanding invention which creates inconvenience to a consumer by not providing the option to temporarily place the item on a table if necessary. Additionally, the drip catching plate is not grippable by a user.

U.S. Pat. No. 2,162,224, discloses a receptacle for an ice cream cone having a second receptacle within. The ice cream cone is manually elevated by a cord. The cord may be cumbersome and difficult to operate, and again this invention does not allow a consumer to rest the item on a table if necessary, nor does it include a holder for a cone and a separate holder for a stick. Also, the cost of manufacturing this receptacle may be prohibitive.

U.S. Pat. No. 5,224,646 discloses a dripless ice cream holder in FIGS. 6 and 7 including a holder for an ice cream cone including apertures in a drip plate allowing melted ice cream to drip to the bottom of the holder, in combination with a pleated internal disk that expands to the shape of the cone and holds the cone. The present invention provides structure that holds food drippings in a cup-like receptacle, and prevents melted ice cream from dripping into the grippable portion of the holder. Additionally, the present invention does not use a pleated disk to hold the ice cream cone, and is thus less expensive to produce.

U.S. Pat. No. 6,202,970 discloses a dripping object holder having a hollow midpoint stem. Separable object support structures snap into, and out of, the hollow stem portion for holding objects to be consumed or to be held. Compared to the present invention, the device of the '970 patent would be significantly more expensive to manufacture, requires assembly prior to use, and the chance for parts to be lost by younger users is substantial.

Yet another disadvantage to the various holders in the prior art is that they cannot be used to manufacture frozen food items for use with the holder. The present invention and disclosure overcome the aforementioned disadvantages of the prior art.

SUMMARY OF THE INVENTION

Among the various aspects of the present invention is the provision of a holder for a frozen food item.

Briefly, therefore, the present invention is directed to a holder for a meltable food product, the holder comprising: a grippable shaft having a first end and a second end, the shaft defining a chamber and including an opening into the chamber at the first end for receiving a cone supporting the meltable food product; a first receptacle disposed at the first end of the shaft such that drips from the meltable food product supported on the cone will collect in the first receptacle; a second receptacle disposed at the second end of the shaft, the second receptacle including a tubular portion for receiving a stick supporting the meltable food product such that drips from the meltable food product supported on the stick will collect in the second receptacle; and a meltable food product mounting cap including a base portion and a stick portion, wherein the base portion attaches to the holder in a first position in which the base portion covers the opening to the chamber and the stick portion is housed within the chamber, or in a second position in which the stick portion extends vertically away from a bottom portion of the first or second receptacle such that drips from the meltable food product supported on the stick portion will collect in the first or second receptacle.

Another aspect of the invention is directed to a holder for a meltable food product, the holder comprising: a grippable shaft having a first end and a second end, wherein the shaft defines a chamber and the first end includes an upper portion having an opening into the chamber for receiving a cone supporting the meltable food product; a first receptacle having side walls and inner and outer bottom portions, wherein the first receptacle is disposed at the first end of the shaft with the upper portion of the first end extending through the inner and outer bottom portions of the first receptacle; a second receptacle having side walls and inner and outer bottom portions, wherein the second receptacle is disposed at the second end of the shaft with the outer bottom portion of the second receptacle extending across a portion of the first end of the shaft opposite the opening in the upper portion of the first end of the shaft, and wherein the second receptacle includes a tubular portion for receiving a stick supporting the meltable food product; and a meltable food product mounting cap including a base portion and a stick portion wherein the base portion attaches to the holder in a first position in which the base portion covers the opening to the chamber and the stick portion is housed within the chamber, or in a second position in which the stick portion extends vertically away from a bottom portion of the first or second receptacle such that drips from the meltable food product supported on the stick portion will collect in the first or second receptacle.

Another aspect of the invention is directed to a method of manufacturing a meltable food product, the method comprising filing the chamber of a holder described herein with a meltable food product precursor substance, attaching the mounting cap to the holder in the first position, cooling the precursor substance to form the meltable food product, and releasing the meltable food product from the chamber.

Other objects and features will be in part apparent and in part pointed out hereinafter.

BRIEF DESCRIPTION OF THE DRAWINGS

The above mentioned and other features of the present invention and the manner of obtaining them will become more apparent and the invention will be best understood by reference to the following description of embodiments of the invention taken in conjunction with the accompanying drawings, in which like numerals refer to like parts, and in which.

DETAILED DESCRIPTION OF THE PREFERRED EMBODIMENTS OF THE INVENTION

The accompanying Figures and this description depict and describe embodiments of a meltable food product holder in accordance with the present invention, and features and components thereof. It should also be noted that any references herein to front and back, right and left, top and bottom and upper and lower are intended for convenience of description, not to limit the present invention or its components to any one positional or spatial orientation.

The present invention relates to a meltable food product holder, generally identified as holder 10 in the related figures. As seen in FIGS. 1A, 1B, 2A, 2B, and 3, for example, holder 10 comprises a grippable shaft 12 intended to be gripped by a consumer in a substantially vertical orientation. In general, these and other figures illustrates a disposable or non-disposable embodiment of the present invention, wherein shaft 12 has a first end 14 and a second end 16.

Figure 2A:
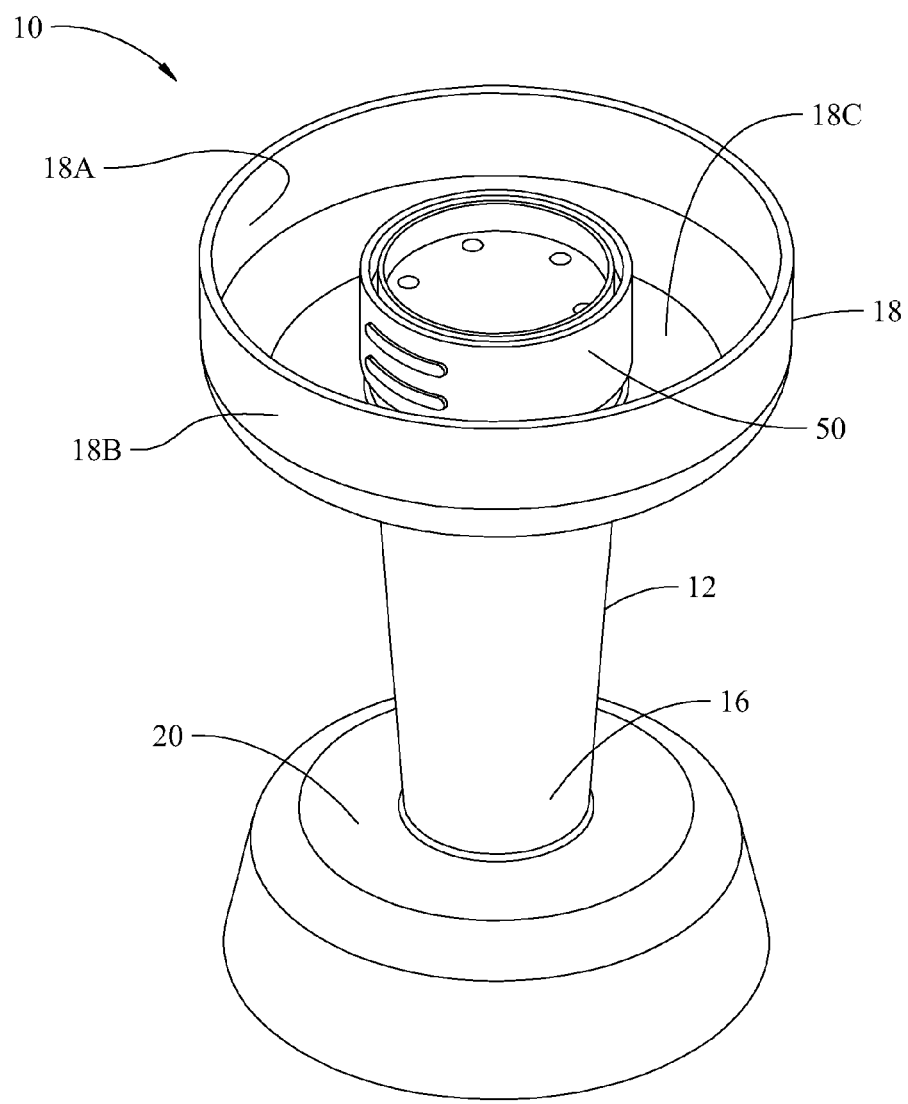
FIG. 2A is a top-front perspective view of the holder described herein showing the meltable food product mounting cap in the first (internal) position.
Figure 2B:
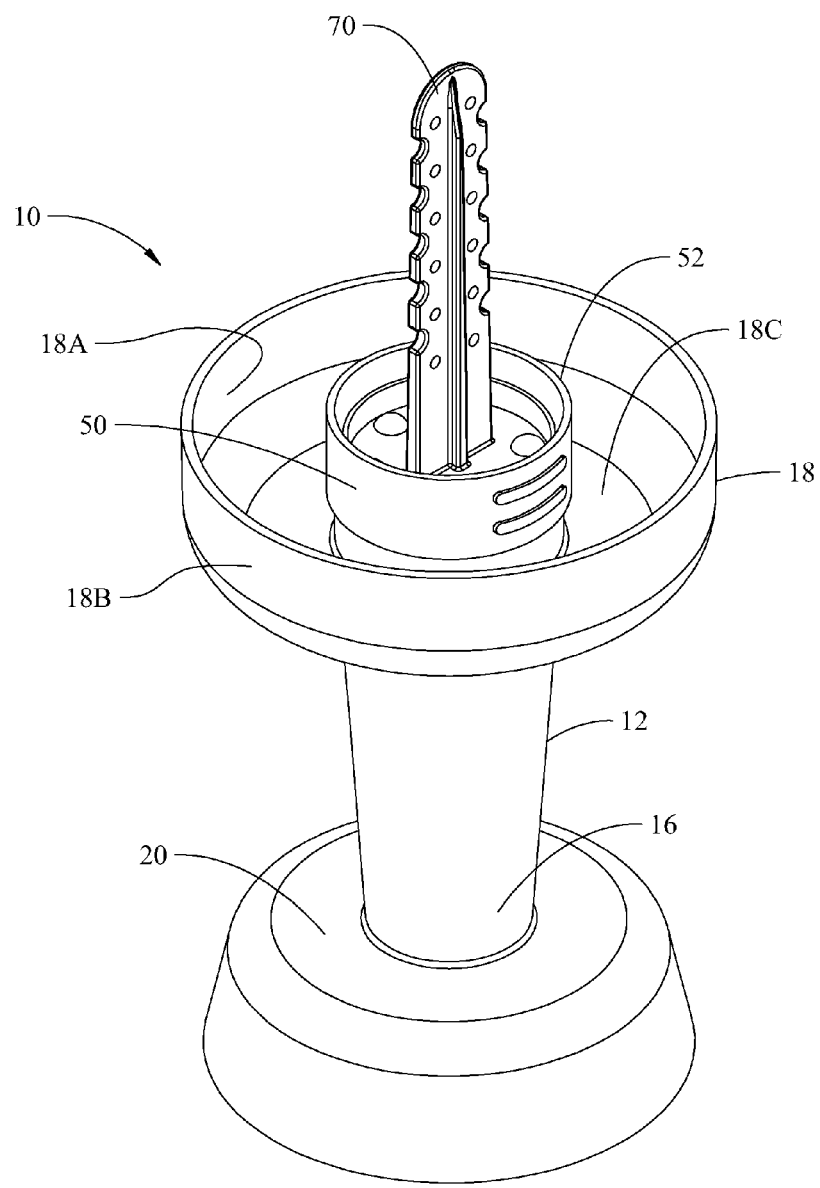
FIG. 2B is a top-front perspective view of the holder described herein showing the meltable food product mounting cap in the second (external or upright) position.
Figure 2C:
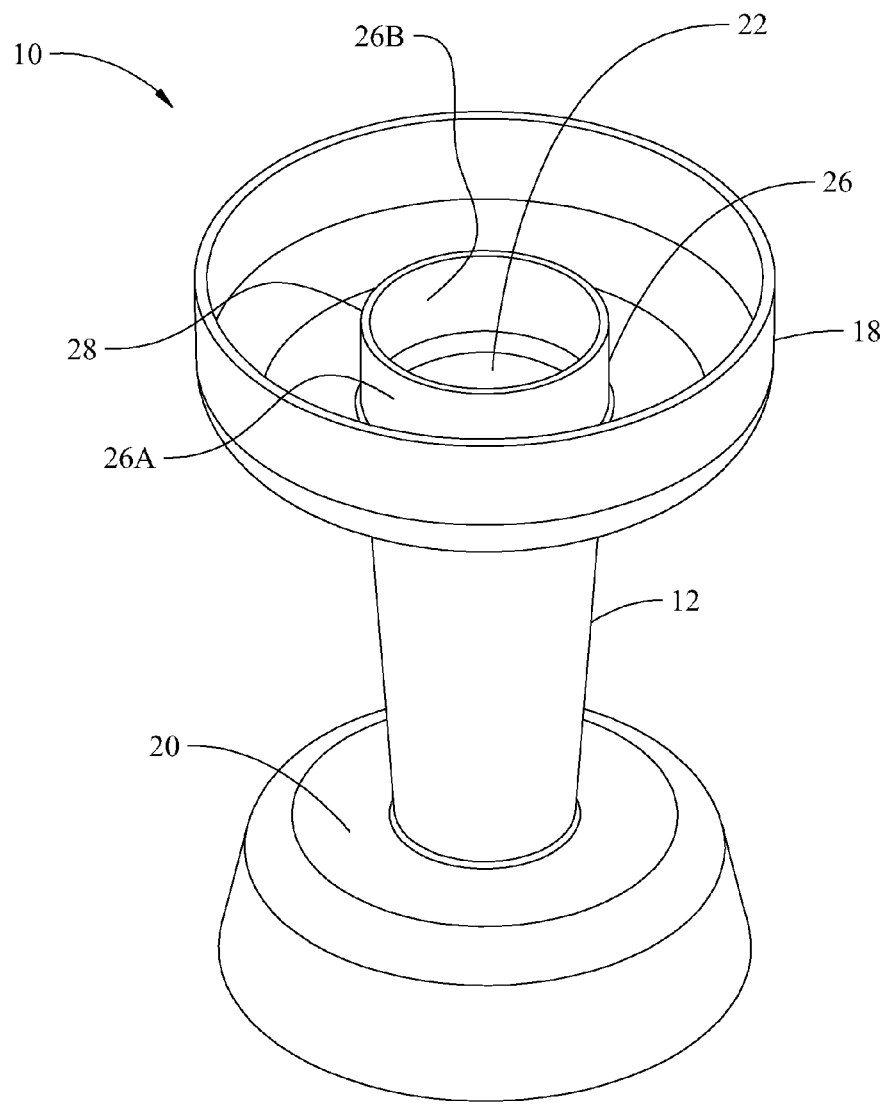
FIG. 2C is a top-front perspective view of the holder described herein without the meltable food product mounting cap.
Figure 3:
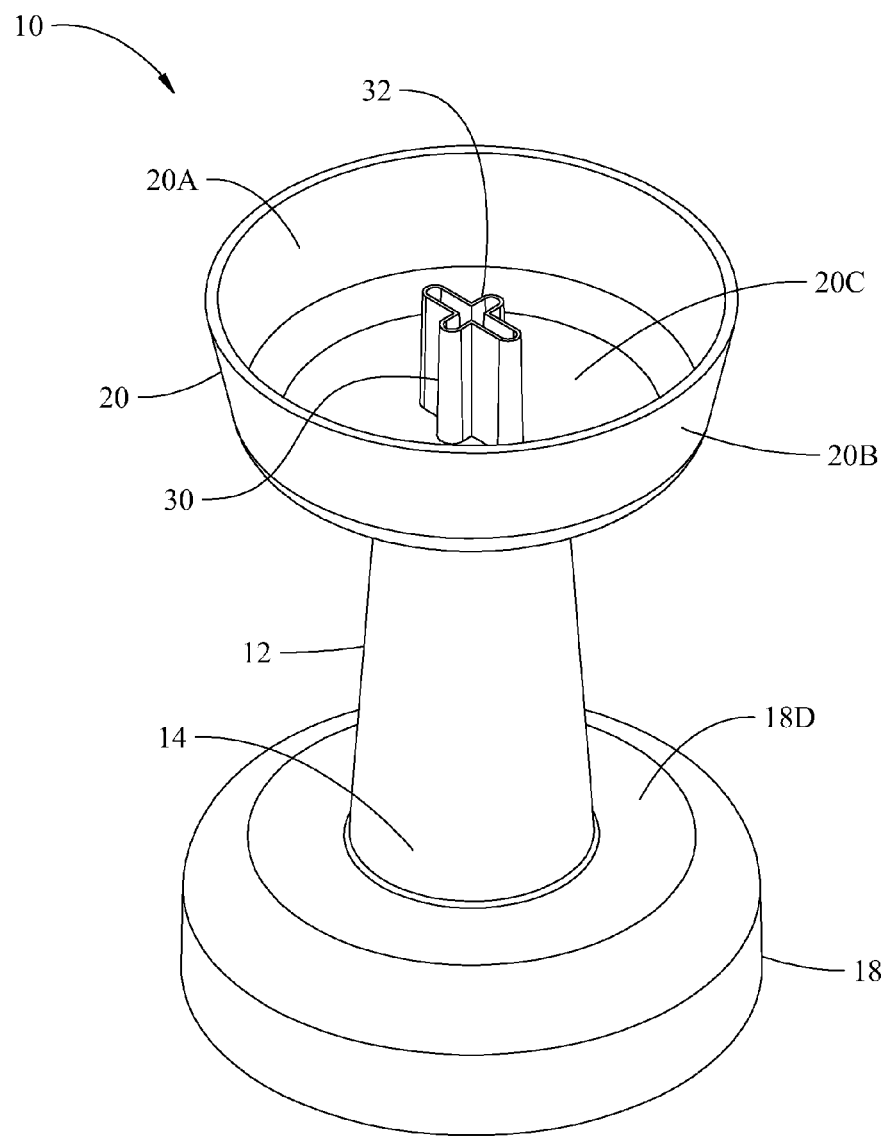
FIG. 3 is a bottom-front perspective view of the holder described herein.
Figure 4A:
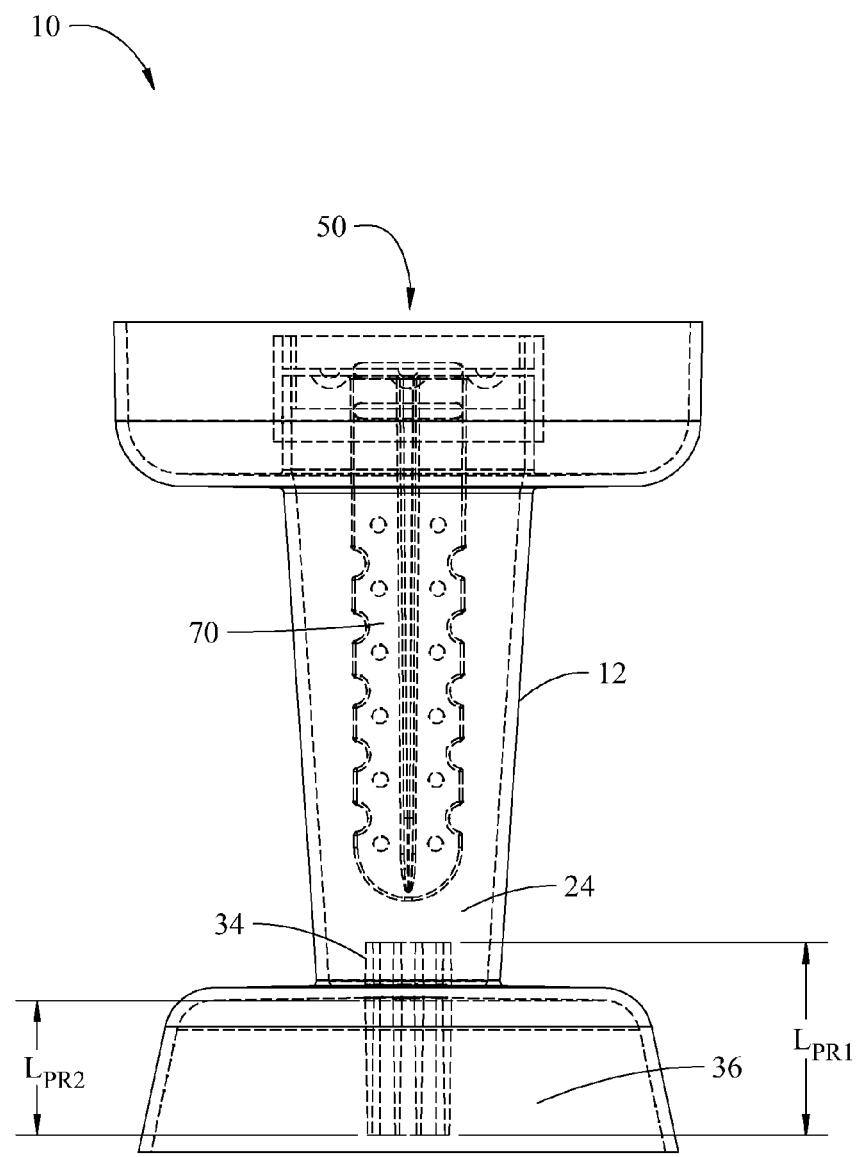
FIG. 4A is a front-hidden line view of the holder described herein showing the meltable food product mounting cap in the first (internal) position.
Figure 4B:
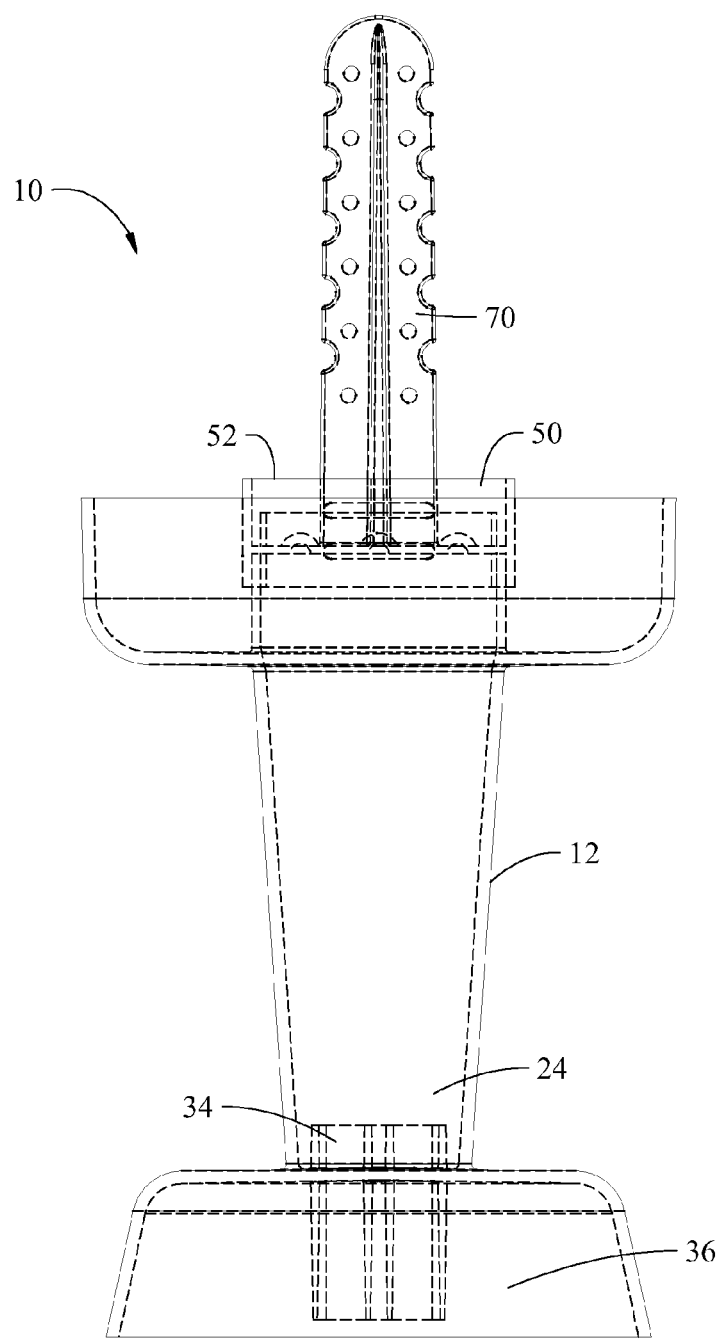
FIG. 4B is a front-hidden line view of the holder described herein showing the meltable food product mounting cap in the second (external or upright) position.
Figure 4C:
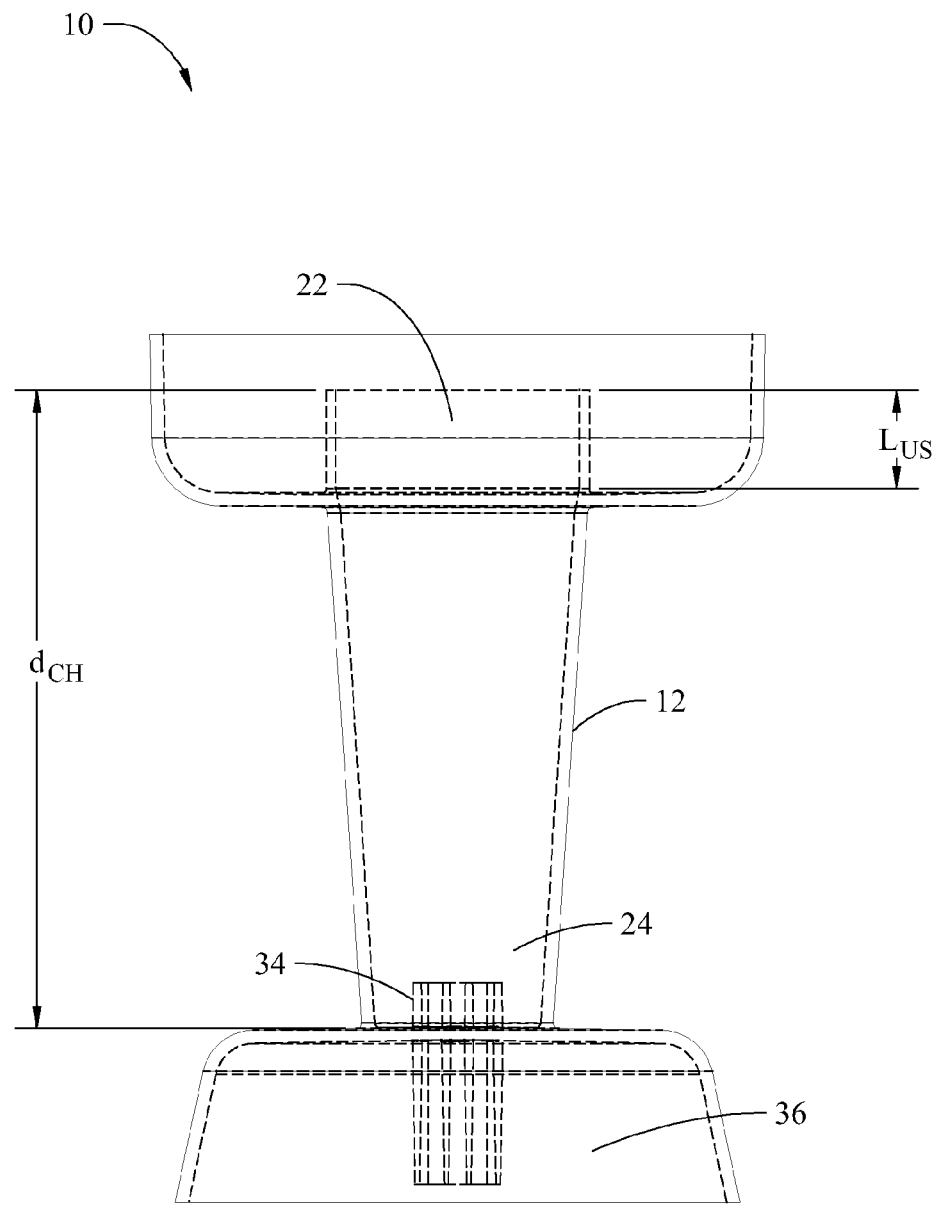
FIG. 4C is a front-hidden line view of the holder described herein without the meltable food product mounting cap.
Figure 5A:
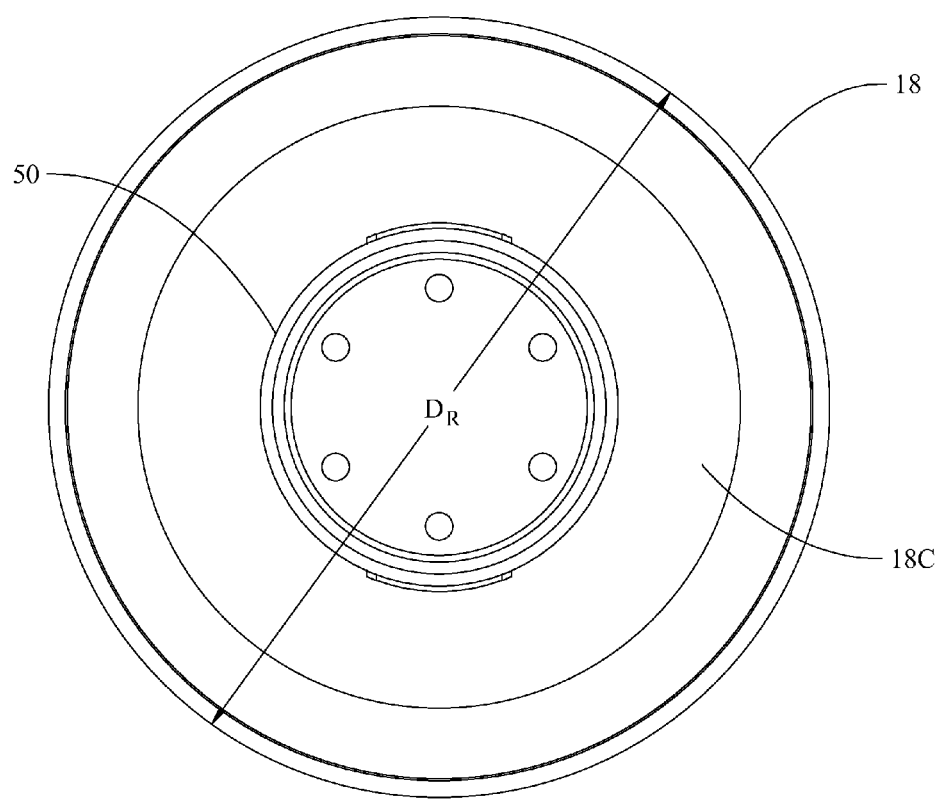
FIG. 5A is a top view of the holder described herein showing the meltable food product mounting cap in the first (internal) position.
Figure 5B:
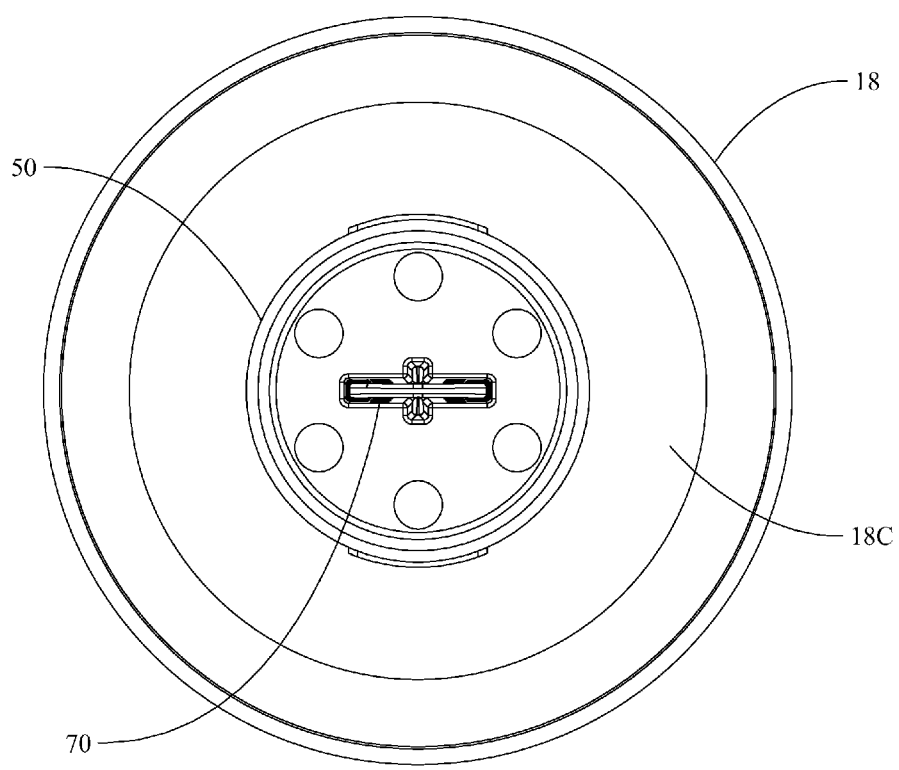
FIG. 5B is a top view of the holder described herein showing the meltable food product mounting cap in the second (external or upright) position.
Figure 5C:
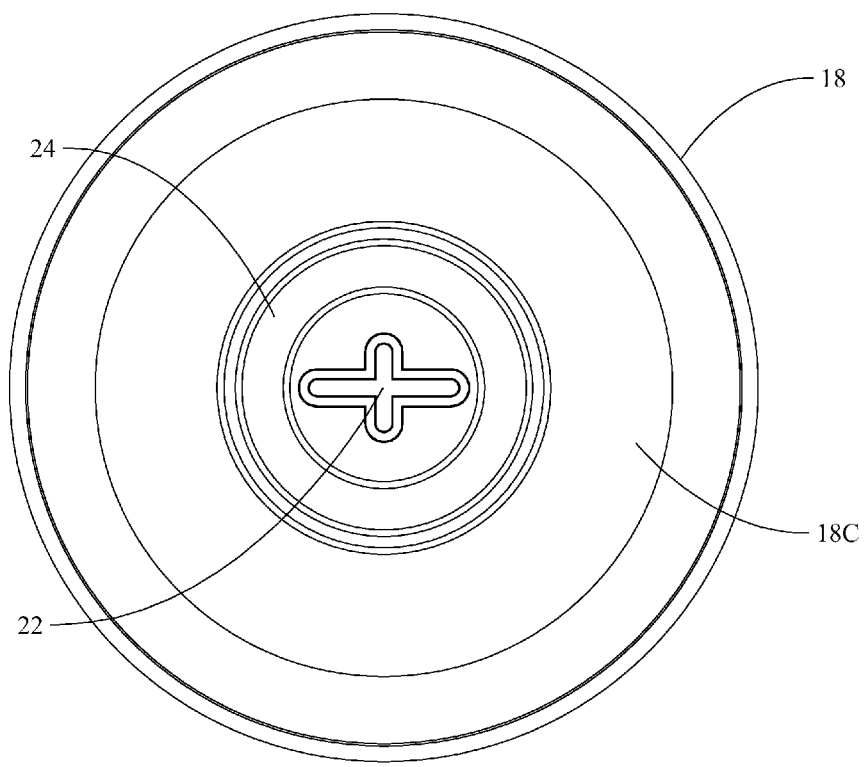
FIG. 5C is a top view of the holder described herein without the meltable food product mounting cap.

Shaft 12 defines a chamber 22 and includes an opening or aperture 24 into the chamber 22 as seen in FIGS. 2C, 4C, and 5C for receiving a cone supporting a meltable food product. The chamber 22 may be elongated within the shaft 12 and may be of varying shapes and dimensions in perimeter and depth. Although the shaft and chamber are depicted in the figures as being tapered from the first end to the second end, it will be understood that the shaft and/or the chamber may or may not be tapered (i.e., substantially cylindrical), or the shaft may be tapered outwardly at the second end (provided the chamber is still capable of accommodating a standard flat bottom or pointed bottom cone). Similarly, it will be understood that the shaft itself may not be tapered but the chamber 22 within the shaft 12 may be tapered, or vice versa. The chamber 22 is closed at the second end 16 by the second receptacle, as seen, for example, in FIGS. 4A, 4B, and 4C.

The shaft 12 may be generally cylindrical (or tapered cylindrical) in shape for ease of gripping by a consumer, although those skilled in the art will recognize that the shape or cross-sectional shape of the shaft 12 may be oval, square, rectangular, pyramidal, or any other polygonal shape, as desired. As discussed below, the length (height) and diameter of the shaft 12 may be of varying dimensions. A variety of dimensions are suitable for consumers of different sizes, for instance, lesser dimensions for children and larger dimensions for adults. Advertising material, trademarks, or logos may also be displayed on the external face of shaft 12 or elsewhere on the holder 10 (e.g., on an inner or outer surface of the first and/or second receptacles 18, 20).

The chamber 24 may remain completely or substantially empty, or may be include filler of any suitable material known in the art. Examples of such material include, but are not limited to, absorbent paper or fiber material, or the like.

Referring to FIGS. 2A-2C and 4A-4C, a first receptacle 18 is disposed at the first end 14 of shaft 12. The first receptacle 18 is generally cup-like in shape and is open at the top. The first receptacle includes inner and outer side walls 18A, 18B, and inner and outer bottom portions 18C, 18D. The first receptacle 18 may be continuously molded with the shaft 12, or may be a separate piece adapted to be adjoined to the shaft 12 by appropriate means known in the art (e.g., snap-fitting, press-fitting, threads, and the like). Although the first receptacle 18 is depicted in the figures as being generally round, those skilled in the art will appreciate that the first receptacle 18 may be of any shape including but not limited to oval, square, rectangular, triangular or any other polygonal shape. Those skilled in the art will also recognize that the dimensions of the first receptacle 18 may vary in height, width and depth, and are not limited to those seen in the various figures.

As best shown in FIGS. 2C, 10A, 11A, and 12A, an upper portion 26 of the shaft extends generally through the middle of the inner and outer bottom portions 18C and 18D of the first receptacle. The upper portion 26 includes an opening or aperture 22 providing access to the chamber 24. The upper portion 26 includes inner and outer side walls 26A and 26B, and terminates in a ledge 28 for supporting a cone inserted into opening 22 by a user, as will be explained. In general, the opening 26 is sufficiently large enough to receive a standard flat-bottom or pointed-bottom cone, yet small enough to cause an upper region of the cone to rest on the ledge 28 without sinking too far into the chamber 24, as discussed in further detail below.

Figure 1A:
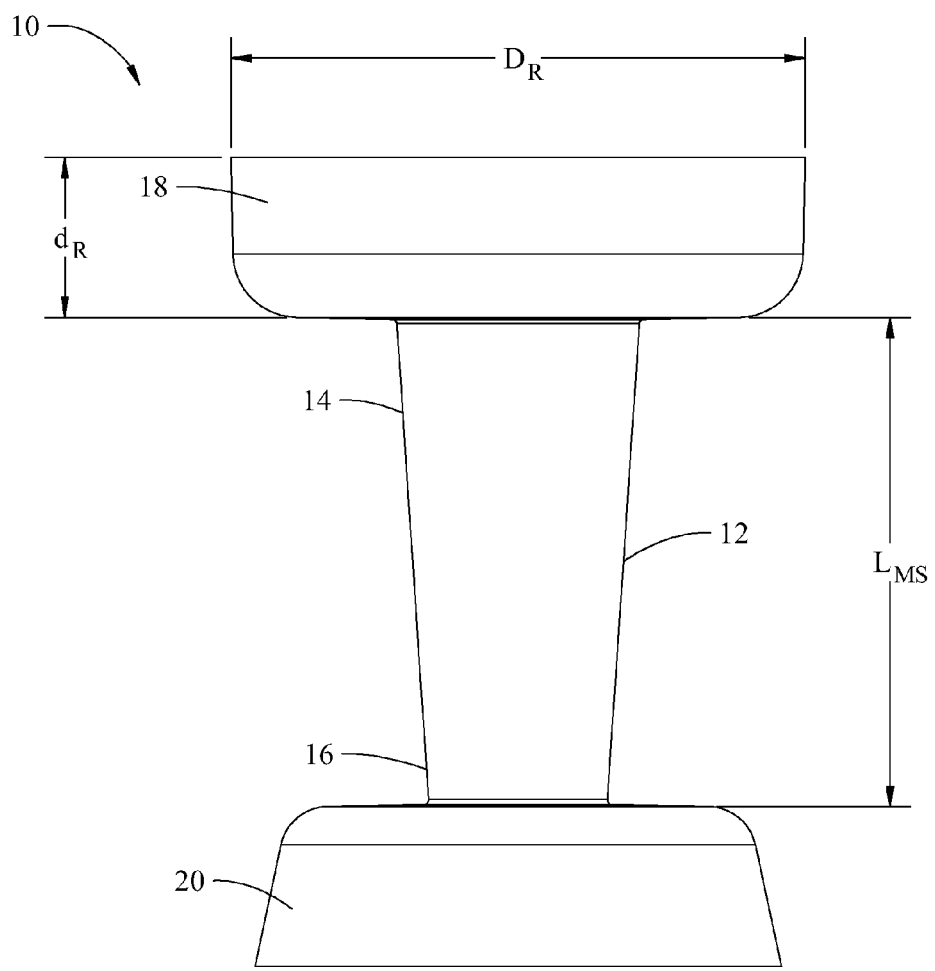
FIG. 1A is a front view of the holder described herein.
Figure 1B:
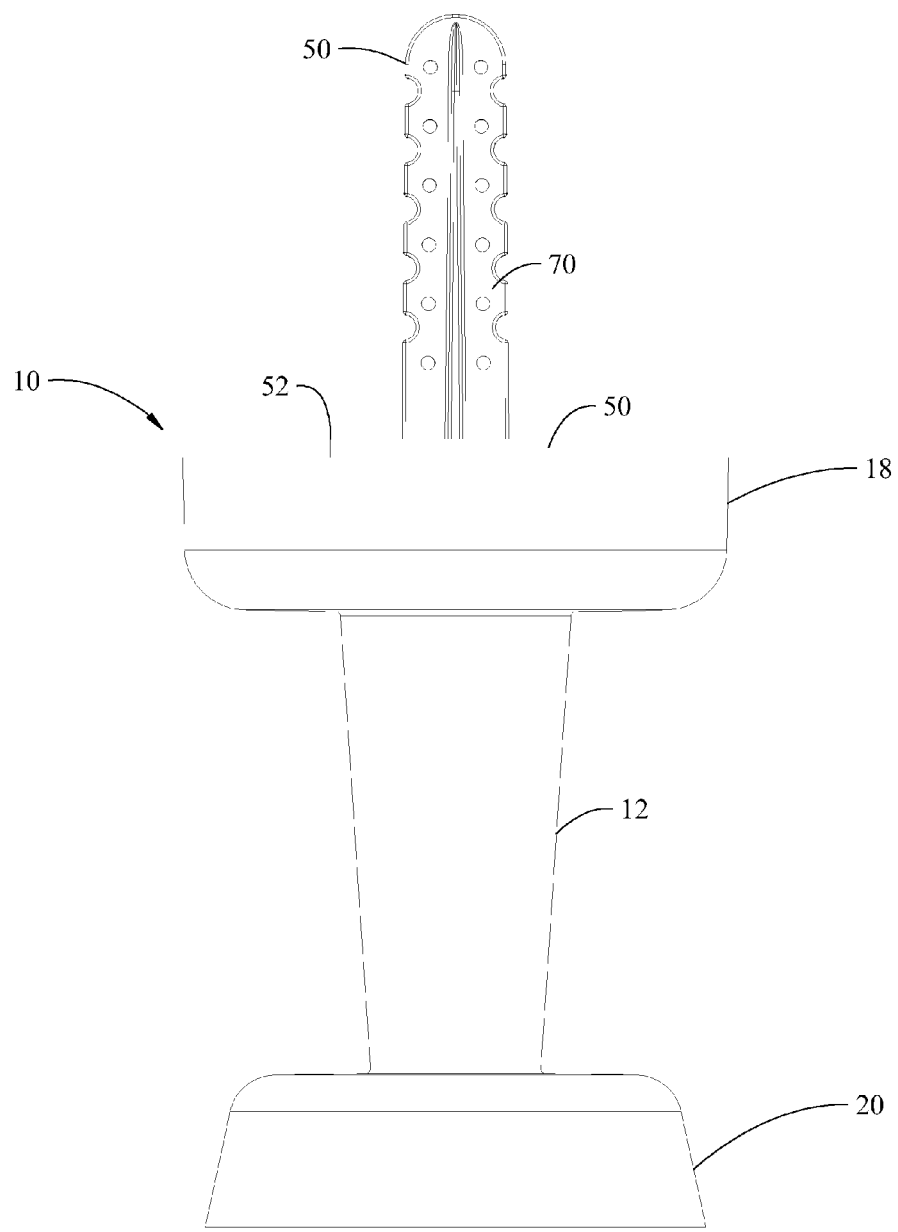
FIG. 1B is a front view of the holder described herein showing the meltable food product mounting cap with the stick portion in the second (external or upright) position.

Referring to FIGS. 1A and 4C, the main portion of the shaft generally has a length ($L_{MS}$) (as measured in a direction parallel from the outer bottom portion of the first and second receptacles) and the upper portion of the shaft has length ($L_{US}$) (as measured in a direction parallel from the inner bottom portion of the first receptacle to the ledge). Typically, the length $L_{MS}$ is from about 5 cm to about 10 cm, more preferably from about 7 cm to about 9 cm; and the length $L_{US}$ is from about 0.5 cm to about 3 cm, more preferably from about 1 cm to about 2 cm. In one embodiment, the ratio of length $L_{MS}$ to length $L_{US}$ is at least 2:1. In one preferred embodiment, the ratio of length $L_{MS}$ to length $L_{US}$ is at least 4:1. In another preferred embodiment, the ratio of length $L_{MS}$ to length $L_{US}$ is at least 5:1. In yet another preferred embodiment, the ratio of length $L_{MS}$ to length $L_{US}$ is about 5:1 to about 5.5:1.

The dimensions of the opening 22 may vary, but the opening 22 and the chamber 24 are generally appropriately dimensioned to receive a cone, flat-bottom or pointed-bottom, that are typical of those on which ice cream (as measured from the outermost edges of the opening) is served. Referring to FIG. 5C, the opening 22 generally has a diameter $D_O$. In one embodiment, the diameter $D_O$ is from about 3 cm to about 5 cm; more preferably in this embodiment, the diameter $D_O$ is from about 3.5 cm to about 4.5 cm. The first receptacle 18 catches the drippage of a melting food product when being consumed by a consumer and the cone is placed in opening 22. Preferably, the drippings from the meltable food product supported on the cone collect and are held in the region of the first receptacle 18 between the intersection of the outer side wall 26A of the upper portion 26 and the inner bottom portion 18C and the inner side wall 18A of the first receptacle.

As discussed elsewhere herein, the chamber is generally has a depth that is sufficient to receive a standard flat-bottom or pointed-bottom cone. Referring to FIG. 4C, the chamber 24 generally has a depth $d_{CH}$ (as measured from the ledge 28 down to the outer bottom portion of the second receptacle which closes the chamber. In one embodiment, the depth $d_{CH}$ is from about 7 cm to about 12 cm; more preferably in this embodiment, the depth $d_{CH}$ is from about 9 cm to about 10 cm.

The holder 10 also includes a second receptacle 20 at the second end 16 of the shaft. Similar to the first receptacle 18, the second receptacle 20 is generally cup shaped and includes inner and outer side walls 20A, 20B, and inner and outer bottom portions 20C, 20D. The second receptacle 20 may be continuously molded with the shaft 12, or may be a separate piece adapted to be adjoined to the shaft 12 by appropriate means known in the art (e.g., snap-fitting, press-fitting, threads, and the like). Although the second receptacle 20 is depicted in the figures as being generally round, those skilled in the art will appreciate that the second receptacle 20 may be of any shape including but not limited to oval, square, rectangular, triangular or any other polygonal shape, and that the first and second receptacles may have different shapes. Those skilled in the art will also recognize that the dimensions of the second receptacle 20 may vary in height, width and depth, and are not limited to those seen in the various figures.

In various embodiments described herein, either one or both of the receptacles 18 and 20 are of sufficient diameter to provide a supporting base for the holder 10 when the holder is placed on a flat surface. Thus, either an ice cream cone or an ice cream bar on a stick (or on mounting cap 50 described herein), for example, could be placed on a flat surface and left unattended without toppling over. Also, while left unattended, the drippings from the melting food product will be caught by either receptacle 18 or 20 (depending on the orientation of the holder 10), and not drip onto the flat surface, thereby preventing any mess.

Referring to FIGS. 1A and 5A, the first and second receptacles generally have a diameter $D_R$ (as measured from the outermost edge of the first or second receptacle). Although not depicted in the figures, it will be understood that, in the event that the diameters of the first and second receptacles are different, they may have a diameter $D_{R1}$ (for the first receptacle) and a diameter $D_{R2}$ (for the second receptacle). In one embodiment, for example, the diameter of the first receptacle $D_{R1}$ is greater than the diameter of the second receptacle $D_{R2}$. In general, the diameter $D_R$ for either one or both of the first or second receptacle is greater than the attendant width of a meltable food item held by the holder, so that drips will collect in the receptacle. Typically, the diameter $D_R$ (for the first and/or second receptacle) is from about 5 cm to about 15 cm, more preferably from about 6 cm to about 12 cm. In one embodiment, the diameter $D_R$ (for the first and/or second receptacle) is from about 7 cm to about 10 cm.

Also referring to FIG. 1A, the first and second receptacles generally have a depth $d_R$ (as measured from the outermost edge of the first or second receptacle to the inner bottom portion of the first or second receptacle). As with diameter $D_R$, it will be understood that, in the event that the depth of the first and second receptacles are different, they may have depths $d_{R1}$ (for the first receptacle) and depth $d_{R2}$ (for the second receptacle). Typically, the depth $d_R$ (for the first and/or second receptacle) is from about 1.5 cm to about 3 cm, more preferably from about 2 cm to about 3 cm. In one embodiment, the depth $d_R$ (for the first and/or second receptacle) is from about 2 cm to about 2.5 cm.

In one embodiment, the ratio of depth $d_{CH}$ to depth $d_R$ is at least 2:1, more preferably at least 3:1. In one preferred embodiment, the ratio of depth $d_{CH}$ to depth $d_R$ is at least 4:1. In yet another preferred embodiment, the ratio of depth $d_{CH}$ to depth $d_R$ is about 4:1 to about 4.5:1.

In another embodiment, the ratio of length $L_{MS}$ to depth $d_R$ is less than 5:1, more preferably less than 4:1. In one preferred embodiment, the ratio of length $L_{MS}$ to depth $d_R$ is less than 3.75:1. In yet another preferred embodiment, the ratio of length $L_{MS}$ to depth $d_R$ is about 3:1 to about 4:1.

In another embodiment, the ratio of diameter $D_R$ to diameter $D_O$ is at least 1.5:1. In one preferred embodiment, the ratio of diameter $D_R$ to diameter $D_O$ is at least 2:1. In yet another preferred embodiment, the ratio of diameter $D_R$ to diameter $D_O$ is about 2:1 to about 2.5:1.

In yet another embodiment, the ratio of depth $d_{CH}$ to depth $d_R$ is at least 2:1; more preferably in this embodiment, the ratio of depth $d_{CH}$ to depth $d_R$ is at least 4:1. In one preferred embodiment, the ratio of depth $d_{CH}$ to depth $d_R$ is about 4:1 to about 4.5:1.

Generally disposed in the bottom portion of second receptacle 20 is projection 30. Projection 30 is configured to be suitable for receiving a stick, typical of those on which frozen confections (e.g., popsicles) and ice cream bars are supported and served. As best seen in FIGS. 3, 6, 10B, and 11B, projection 30 is typically positioned in the center of the second receptacle 20. Projection 30 is free-standing; that is, the projection 30 is generally secured to the holder 10 at the inner bottom portion 20C of the second receptacle 20; the upper region 36 of projection 30 is free of support or attachment to any other part of the second receptacle 20 or holder 10.

Figure 6:
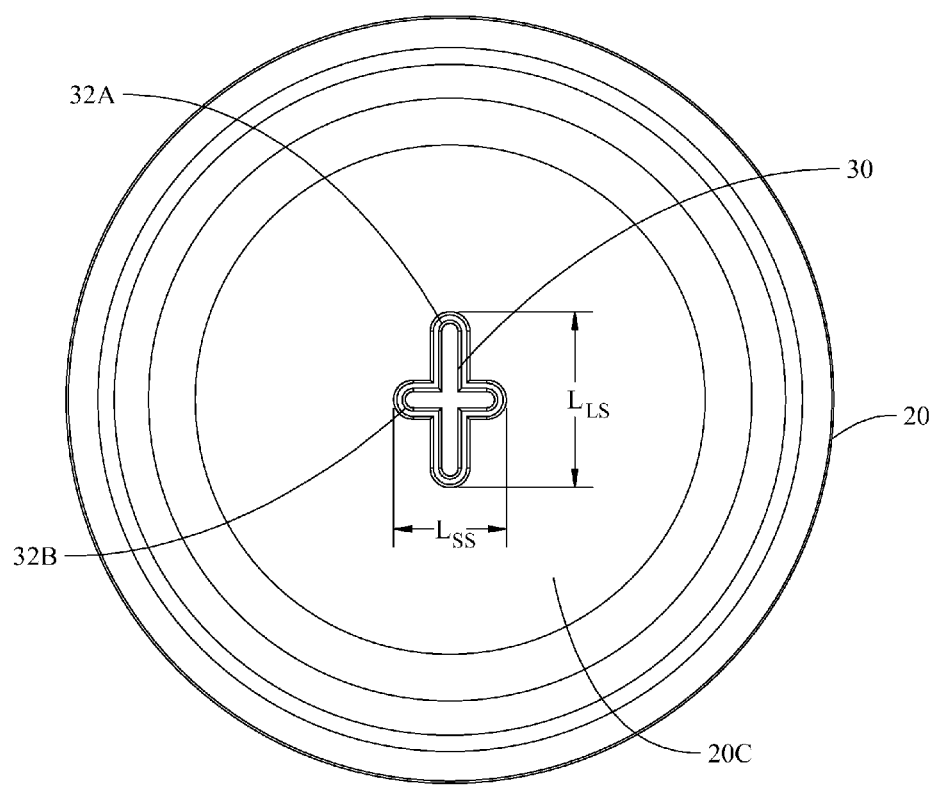
FIG. 6 is a bottom view of the holder described herein.

Projection 30 has a centrally-located opening or aperture 32 for receiving the stick. In one embodiment, aperture 32 is generally elongated in cross section in perpendicular directions, as best seen in FIG. 6. The aperture 32 opens into one or more slots 32A and 32B formed internally of projection 30. Slots 32A and 32B are dimensioned in cross-section and length to receive and hold a stick upon which an ice cream or confection bar is mounted. As shown, the slots 32A and 32B can be differently sized to accommodate different sized sticks (i.e., large slot 32A and small slot 32B), or the slots may be the same size. Typically, the projection 30 is formed of relatively thin material, substantially the same thickness as the remainder of the material comprising holder 10. The lower region 34 of projection 30 is closed to provide support for a stick inserted through aperture 32, and extends below the bottom portion 20C and a short distance into chamber 24, as best seen in FIGS. 4A and 5C. Preferably, the drippings from the meltable food product supported in the stick collect and are held in the region of the second receptacle 20 between the intersection of the projection 30 and the inner bottom portion 20C and the inner side wall 20A of the second receptacle.

Referring to FIG. 4A, projection 30 generally has a length $L_{PR1}$ (as measured from the uppermost edge of the projection 30 to the bottom of the projection extending into chamber 24) and length $L_{PR2}$ (as measured from the uppermost edge of the projection 30 to the bottom portion 20C of the second receptacle). Typically, the length $L_{PR1}$ is from about 2 cm to about 4 cm, more preferably from about 2.5 cm to about 3.5 cm. In one embodiment, the length $L_{PR1}$ is from about 3 cm to about 3.5 cm. The length $L_{PR2}$ is typically from about 1 cm to about 3 cm, more preferably from about 2 cm to about 3 cm. In one embodiment, the length $L_{PR2}$ is from about 2 cm to about 2.5 cm.

In one embodiment, the ratio of length $L_{MS}$ to length $L_{PR2}$ is at least 2:1. In one preferred embodiment, the ratio of length $L_{MS}$ to length $L_{PR2}$ is at least 3:1; more preferably at least 3.5:1. In another preferred embodiment, the ratio of length $L_{MS}$ to length $L_{PR2}$ is about 3.5:1 to about 4:1.

As shown in FIG. 6, slots 32A and 32B are different sizes to accommodate different size sticks. Slot 32A (the longer of the two) generally has a length $L_{LS}$ (as measured from the outermost opposing edges of the projection parallel to the slot), while slot 32B (the shorter of the two) generally has a length $L_{SS}$ (as measured from the outermost opposing edges of the projection parallel to the slot). Typically, the length $L_{LS}$ is from about 1.5 cm to about 2.5 cm, more preferably from about 1.75 cm to about 2.25 cm. In one embodiment, the length $L_{LS}$ is from about 2 cm. The length $L_{SS}$ is typically from about 1 cm to about 2 cm, more preferably from about 1 cm to about 1.5 cm. In one embodiment, the length $L_{SS}$ is from about 1.25 cm to about 1.5 cm. In one embodiment, the ratio of length $L_{LS}$ to length $L_{SS}$ is at least 1:1. In one preferred embodiment, the ratio of length $L_{LS}$ to length $L_{SS}$ is at least 1.25:1; more preferably at least 1.5:1. In another preferred embodiment, the ratio of length $L_{LS}$ to length $L_{SS}$ is from about 1.5:1 to about 1.75:1.

In use, the holder 10 illustrated in the various figures is adapted to be a disposable or non-disposable embodiment of the present invention, and can be used to hold ice cream cones of varying shapes. The cone, not shown, is inserted through opening 22 until the cone abuts against ledge 28, and the bottom of the cone extends into chamber 24. As the ice cream, or other frozen confection, supported by the cone begins to melt, the drippings are caught and held in first receptacle 18, between the outer side wall 26B and the inner side wall 18A and away from the hand of the user. When the ice cream reaches the level of the top of the cone, the cone is removed from the holder 10.

As stated previously, the embodiment of holder 10 illustrated in the figures can be disposable after each use, in which case the holder 10 is manufactured of low cost materials, such as cardboard, paperboard, relatively thin plastic, or the like. The holder 10 can also display advertising copy on the exterior of shaft 12. A non-disposable version of the embodiment illustrated in the figures will be made of more durable material, such as molded plastic, a plastic coated paper, ceramic, clay or any other suitable material. Preferably, this material will also be washable in hot water for reuse.

Among other aspects of the invention, the embodiments of the holder 10 illustrated, for example, in FIGS. 10A, 10B, 11A, and 11B, are adapted to hold a cone for ice cream or other frozen confection inserted into opening 22 and held against ledge 28. The drippings from the melting confection will be caught in receptacle 18, also as previously described. The holder 10 also includes second receptacle 20 and projection 30. In the alternate use of this embodiment, the holder 10 is inverted such that second receptacle 20 and projection 30 are facing upward. A stick, on which an ice cream or frozen confection food product is supported, is inserted into aperture 32 (e.g., into slot 32A or slot 32B) such that the stick is lodged loosely or tightly in projection 30. The elongated configuration of the projection 30 holds the food product in place while the user grips shaft 12 with one hand. The melting food product drips into and is caught by second receptacle 20, between the projection 30 and the inner side wall 20A and away from the hand of the user.

The holder 10 also includes a meltable food product mounting cap 50. As shown in FIGS. 8A-8D, cap 50 has a base portion 52 and a stick portion 70, the stick portion being generally disposed in the center of the base portion. Typically, the stick portion is a substantially flat stick similar in shape to conventional sticks used in frozen confections or as tongue depressors. The location of the stick portion 70 relative to the base portion 52 allows the stick portion to be substantially centrally-located within a meltable food product during and after its formation, as will be described below.

Figure 8A:
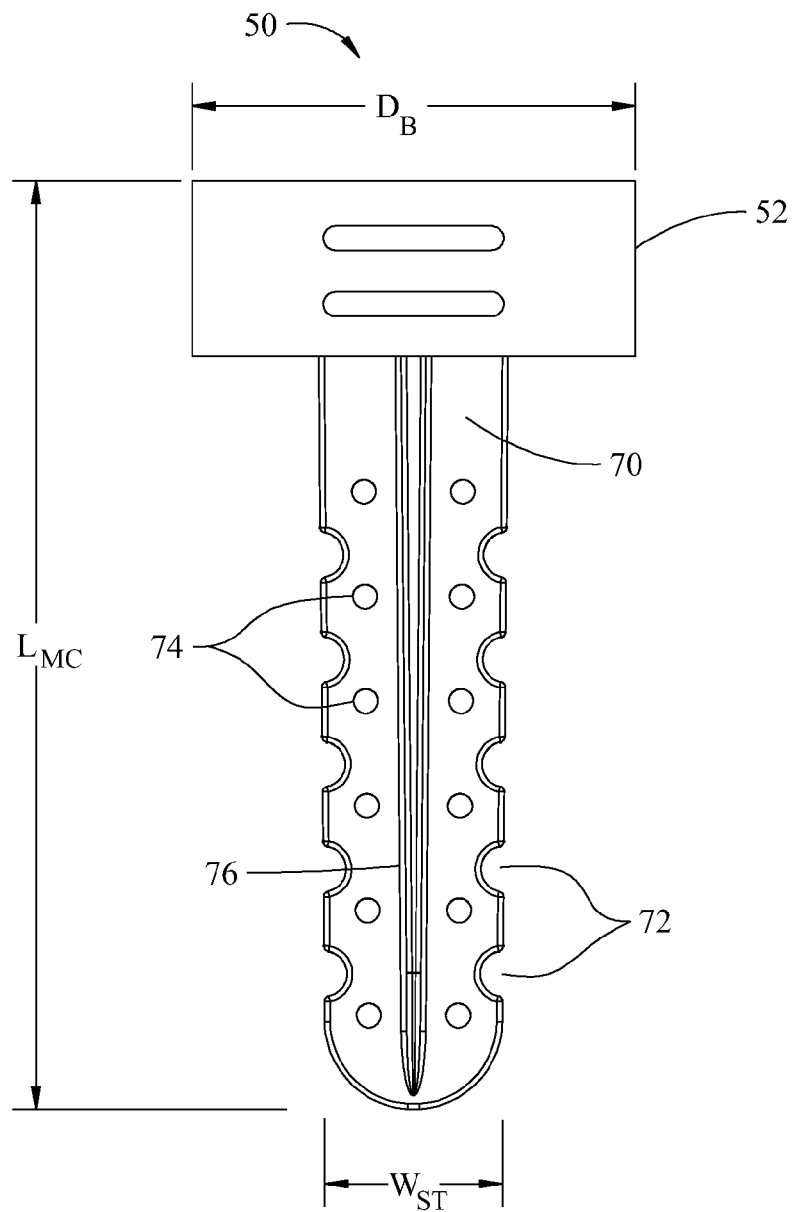
FIG. 8A is a front view of the meltable food product mounting cap.
Figure 8B:
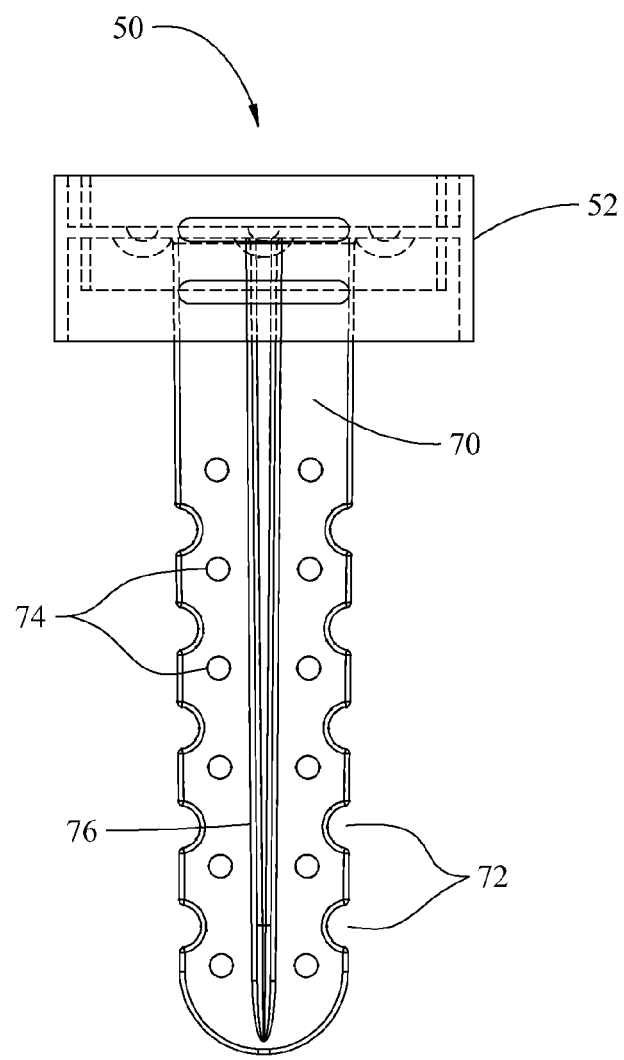
FIG. 8B is a front-hidden line view of the meltable food product mounting cap.
Figure 8C:
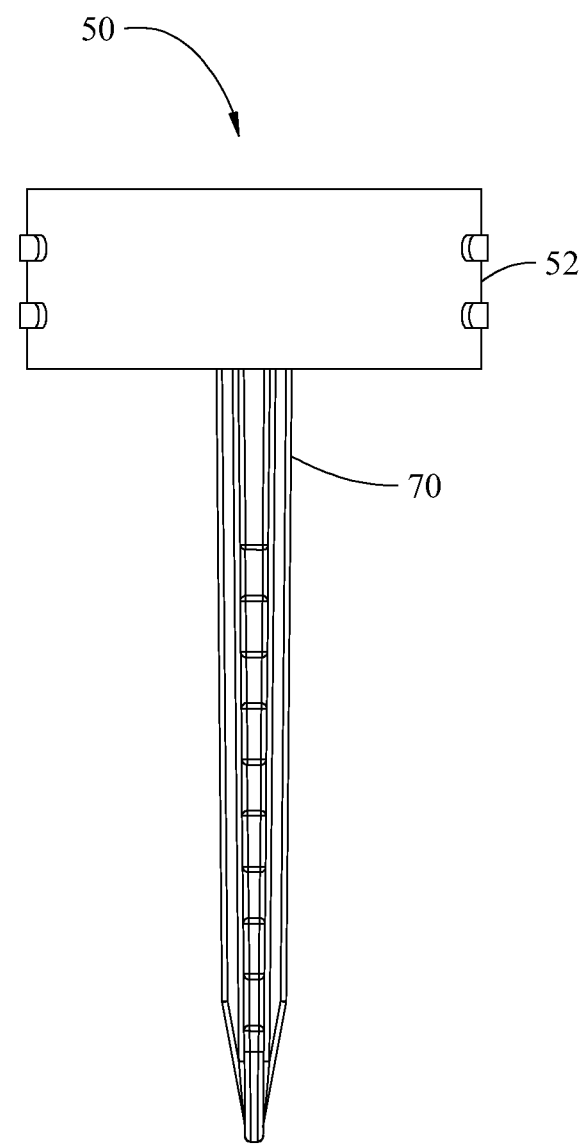
FIG. 8C is a right side view of the meltable food product mounting cap.
Figure 8D:
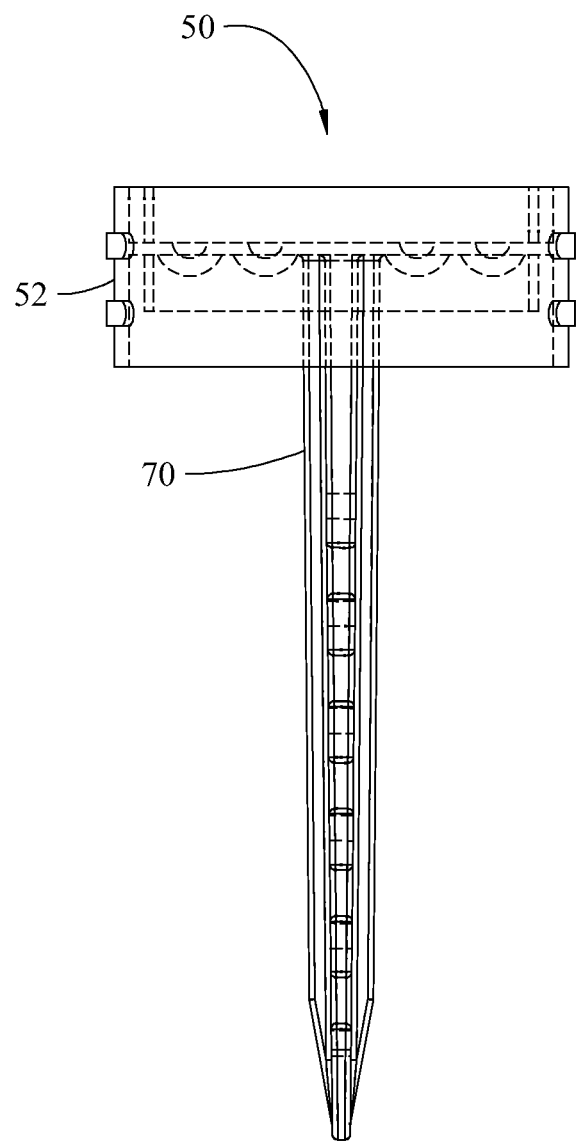
FIG. 8D is a right side-hidden line view of the meltable food product mounting cap.

Referring to FIG. 8A, mounting cap 50 generally has a length ($L_{MC}$) (as measured in a direction parallel from the bottom of the base portion to the tip of the stick portion). Typically, the length $L_{MC}$ is from about 8 cm to about 12 cm, more preferably from about 8 cm to about 10 cm. In one preferred embodiment, the length $L_{MC}$ is from about 8.5 cm to about 9.5 cm. Also referring to FIG. 8A, the base portion generally has a diameter $D_B$ (as measured from the outermost edges of the base portion). In one embodiment, the diameter $D_B$ is from about 3 cm to about 5 cm; more preferably in this embodiment, the diameter $D_B$ is from about 4 cm to about 4.5 cm. With continued reference to FIG. 8A, the stick portion generally has a width $W_{ST}$ (as measured horizontally from one outer edge of the stick portion to the other outer edge). In one embodiment, the width $W_{ST}$ is from about 0.5 cm to about 4 cm; more preferably in this embodiment, the width $W_{ST}$ is from about 1 cm to about 2 cm.

In one embodiment, the ratio of length $L_{MS}$ to length $L_{MC}$ is less than 1:1. In one preferred embodiment, the ratio of length $L_{MS}$ to length $L_{MC}$ is less than 0.95:1. In another preferred embodiment, the ratio of length $L_{MS}$ to length $L_{MC}$ is about 0.9:1 to about 0.95:1.

In another embodiment, the ratio of diameter $D_R$ to diameter $D_B$ is greater than 1:1. In one preferred embodiment, the ratio of diameter $D_R$ to diameter $D_B$ is greater than 1.5:1. In another preferred embodiment, the ratio of diameter $D_R$ to diameter $D_B$ is about 1.5:1 to about 2.5:1.

In another embodiment, the ratio of depth $d_R$ to length $L_{MC}$ is less than 1:1. In one preferred embodiment, the ratio of depth $d_R$ to length $L_{MC}$ is less than 0.75:1; more preferably in this embodiment less than 0.5:1. In another preferred embodiment, the ratio of depth $d_R$ to length $L_{MC}$ is 0.1:1 to 0.3:1.

In another embodiment, the ratio of diameter $D_O$ to width $W_{ST}$ is greater than 1.5:1. In one preferred embodiment, the ratio of diameter $D_O$ to width $W_{ST}$ is greater than 2:1; more preferably in this embodiment greater than 2.25:1. In another preferred embodiment, the ratio of diameter $D_O$ to width $W_{ST}$ is 2:1 to 2.5:1.

It will be understood that the various dimensions described herein (i.e., $L_{MS}$, $L_{US}$, $L_{MC}$, $L_{PR1}$, $L_{PR2}$, $L_{LS}$, $L_{SS}$, $D_R$, $D_B$, $D_O$, $d_R$, $d_{CH}$, and $W_{ST}$) and the various ranges thereof can be combined to form a holder of the invention with a variety of different sizes. By way of example, the holder 10 can have an $L_{MC}$ of about 8 cm to about 10 cm, a $D_R$ of about 7 cm to about 10 cm, and $D_B$ of about 3 cm to about 5 cm. By way of another example, the holder 10 can have an $L_{MS}$ of about 7 cm to about 9 cm, a $D_B$ of about 3 cm to about 5 cm, an $L_{LS}$ of about 1.75 cm to about 2.25 cm, and an $L_{SS}$ of about 1 cm to about 1.5 cm. By way of another example, the holder 10 can have a $d_R$ of about 2 cm to about 2.5 cm, an $L_{PR1}$ of about 3 cm to about 3.5 cm, and $D_O$ of about 3.5 cm to about 4.5 cm. By way of another example, the holder 10 can have an $L_{MC}$ of about 8 cm to about 10 cm, a $D_B$ of about 3 cm to about 5 cm, and $W_{ST}$ of about 1 cm to about 2 cm. By way of another example, the holder 10 can have a $D_O$ of about 3.5 cm to about 4.5 cm, a $D_R$ of about 7 cm to about 10 cm, an $L_{LS}$ of about 1.75 cm to about 2.25 cm, an $L_{SS}$ of about 1 cm to about 1.5 cm, and a $d_R$ of about 2 cm to about 2.5 cm. By way of another example, the holder 10 can have a $D_O$ of about 3.5 cm to about 4.5 cm, an $L_{PR1}$ of about 3 cm to about 3.5 cm, an $L_{MS}$ of about 7 cm to about 9 cm, and a $d_R$ of about 2 cm to about 2.5 cm. By way of another example, the holder 10 can have an $L_{MS}$ of about 7 cm to about 9 cm, an $L_{US}$ of about 0.5 cm to about 3 cm, an $L_{MC}$ of about 8 cm to about 10 cm, an $L_{PR1}$ of about 3 cm to about 3.5 cm, and a $D_R$ of about 7 cm to about 10 cm. By way of another example, the holder 10 can have a $D_R$ of about 7 cm to about 10 cm, a $D_B$ of about 3 cm to about 5 cm, a $D_O$ of about 3.5 cm to about 4.5 cm, a $d_R$ of about 2 cm to about 2.5 cm, a $d_{CH}$ of about 9 cm to about 10 cm, and a $W_{ST}$ of about 1 cm to about 2 cm. By way of another example, the holder 10 can have an $L_{MS}$ of about 7 cm to about 9 cm, an $L_{US}$ of about 0.5 cm to about 3 cm, an $L_{MC}$ of about 8 cm to about 10 cm, an $L_{PR1}$ of about 3 cm to about 3.5 cm, an $L_{PR2}$ of about 2 cm to about 2.5 cm, $L_{LS}$ of about 1.75 cm to about 2.25 cm, $L_{SS}$ of about 1 cm to about 1.5 cm, a $D_R$ of about 7 cm to about 10 cm, a $D_B$ of about 3 cm to about 5 cm, a $D_O$ of about 3.5 cm to about 4.5 cm, a $d_R$ of about 2 cm to about 2.5 cm, a $d_{CH}$ of about 9 cm to about 10 cm, a $W_{ST}$ of about 1 cm to about 2 cm.

Similarly, it will be understood that the different ratios between the various dimensions described herein (i.e., $L_{MS}$, $L_{US}$, $L_{MC}$, $L_{PR1}$, $L_{PR2}$, $L_{LS}$, $L_{SS}$, $D_R$, $D_B$, $D_O$, $d_R$, $d_{CH}$, and $W_{ST}$) can be combined to form a holder of the invention with a variety of different sizes and size relations between parts. Stated differently, each dimension can be compared in a ratio with any other dimension, with multiple combinations of comparisons being contemplated. Thus, in various embodiments, the holder 10 may have any one or a combination of the following: a ratio of length $L_{MS}$ to length $L_{US}$ of about 5:1 to about 5.5:1; a ratio of depth $d_{CH}$ to depth $d_R$ of about 4:1 to about 4.5:1; a ratio of length $L_{MS}$ to depth $d_R$ of about 3:1 to about 4:1; a ratio of diameter $D_R$ to diameter $D_O$ of about 2:1 to about 2.5:1; a ratio of depth $d_{CH}$ to depth $d_R$ of about 4:1 to about 4.5:1; a ratio of length $L_{MS}$ to length $L_{PR2}$ of about 3.5:1 to about 4:1; a ratio of length $L_{LS}$ to length $L_{SS}$ of from about 1.5:1 to about 1.75:1; a ratio of length $L_{MS}$ to length $L_{MC}$ of about 0.9:1 to about 0.95:1; a ratio of diameter $D_R$ to diameter $D_B$ of about 1.5:1 to about 2.5:1; a ratio of depth $d_R$ to length $L_{MC}$ of 0.1:1 to 0.3:1; and/or a ratio of diameter $D_O$ to width $W_{ST}$ of 2:1 to 2.5:1; and any combination thereof.

As depicted in several of the figures, mounting cap 50 is capable of attachment to the holder 10 in a variety of positions. In one embodiment, for example, cap 50 is affixed or secured to the holder 10 in a first position in which the base portion 52 at least partially or, preferably, substantially covers the opening 22 to the chamber 24 and the stick portion 70 is housed within the chamber 24 (see, e.g., FIGS. 2A, 4A, and 5A). This first position is employed, for example, in the formation of a meltable food product as described below or during shipment and/or storage of the holder 10 (e.g., to make the holder 10 more compact). In another embodiment, for example, cap 50 is affixed or secured to the holder 10 in a second position in which the base portion 52 is attached to the first or second receptacle such that the stick portion 70 is in an upright position and extends vertically away from a bottom portion of the first or second receptacle (see, e.g., FIGS. 1B, 2B, 4B, and 12B). As seen in FIGS. 8B, 8D, 9A, and 9B, the bottom portion 52C, 52D is positioned slightly off-center relative to the top and bottom edges of the base portion; thus, the depression formed at the end of the base including the stick portion 70 is deeper than the depression on the opposite end. This configuration provides additional support for a meltable food product mounted to the cap 50, as described below.

Figure 7A:
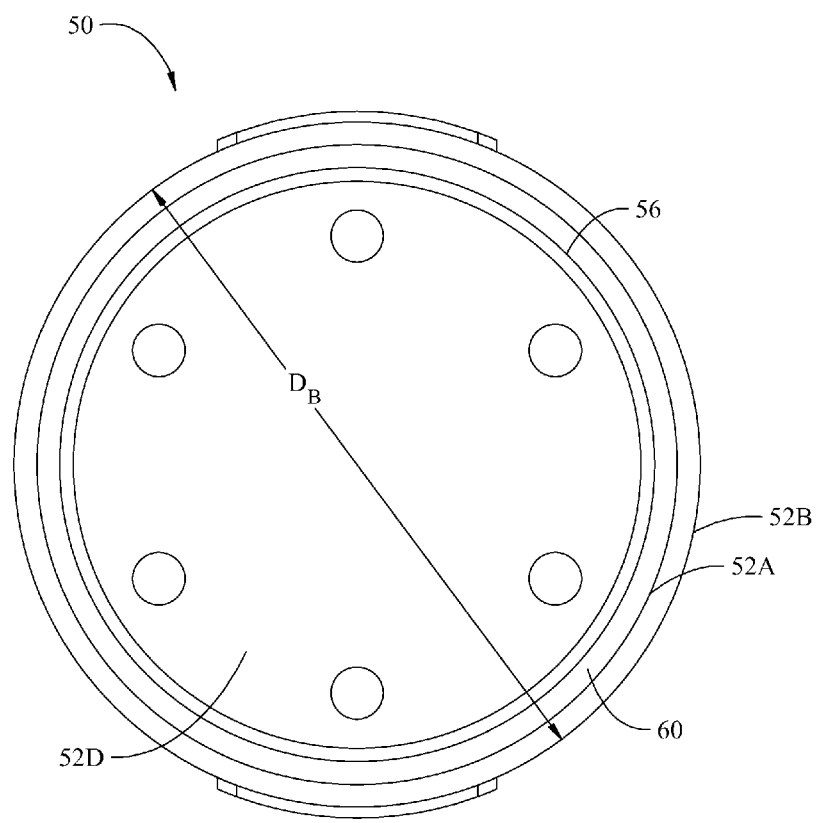
FIG. 7A is a top view of the meltable food product mounting cap.
Figure 7B:
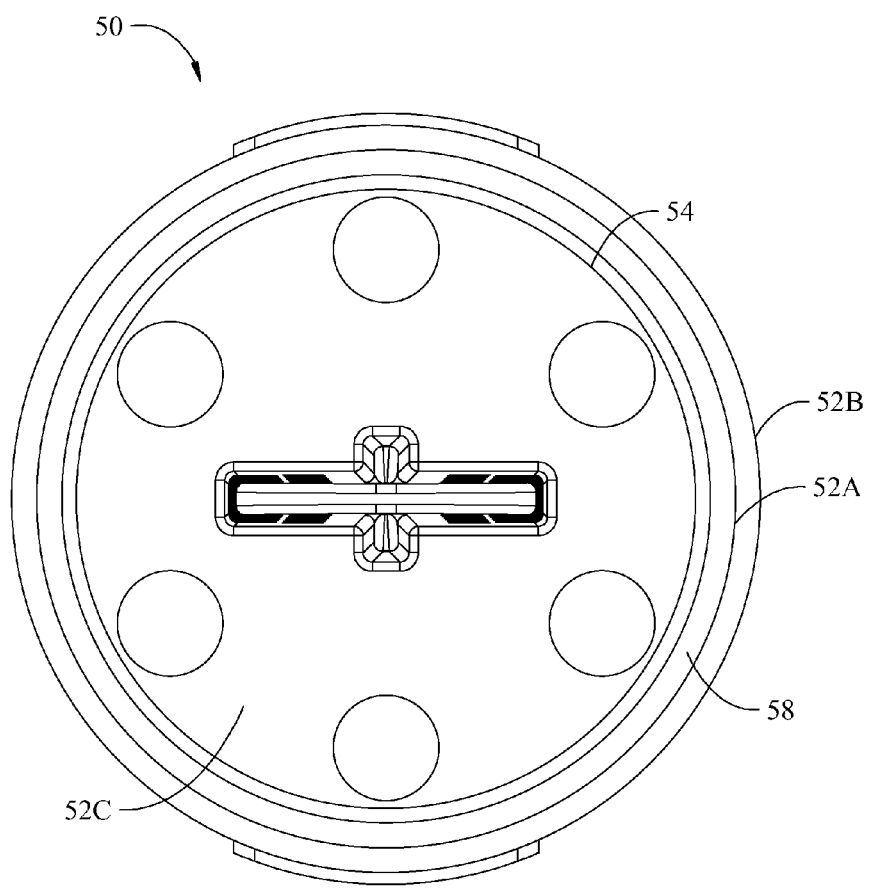
FIG. 7B is a bottom view of the meltable food product mounting cap.
Figure 9A:
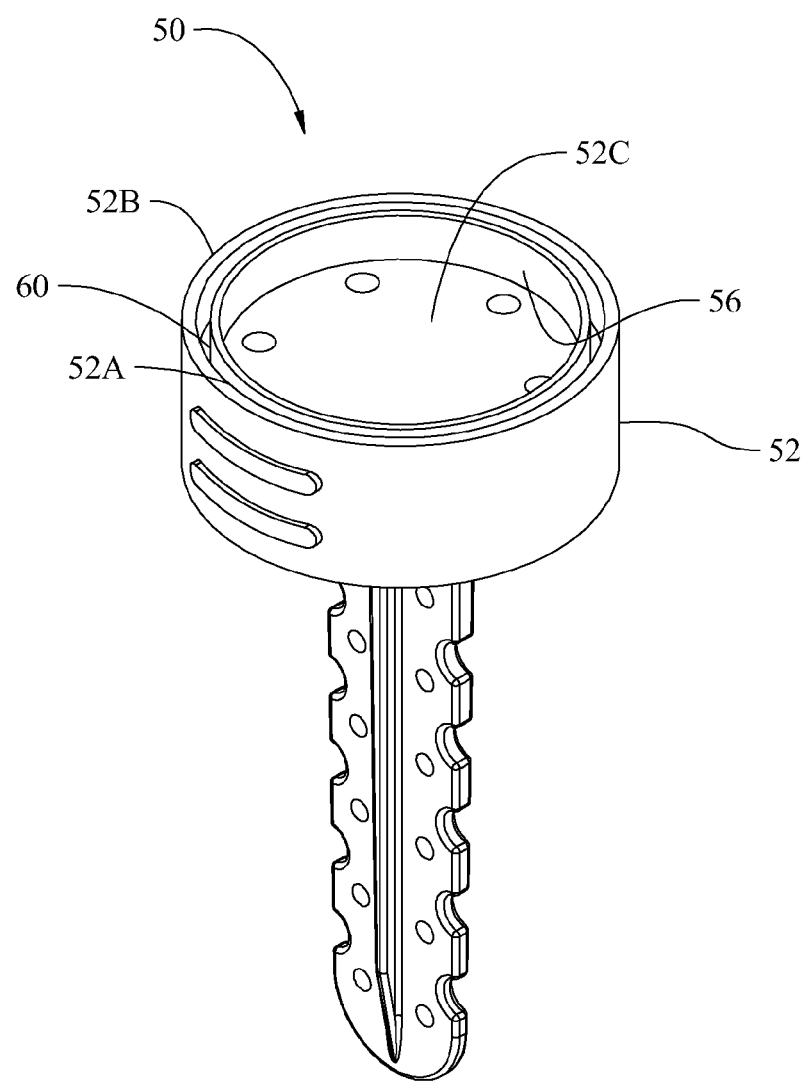
FIG. 9A is a top-front perspective view of the meltable food product mounting cap.
Figure 9B:
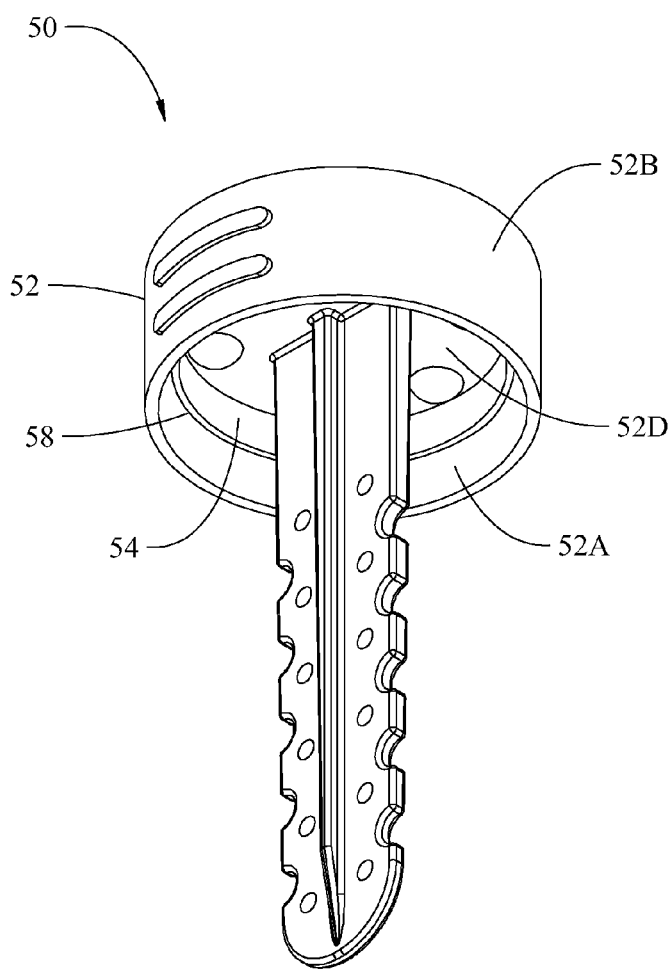
FIG. 9B is a bottom-front perspective view of the meltable food product mounting cap.
Figure 10A:
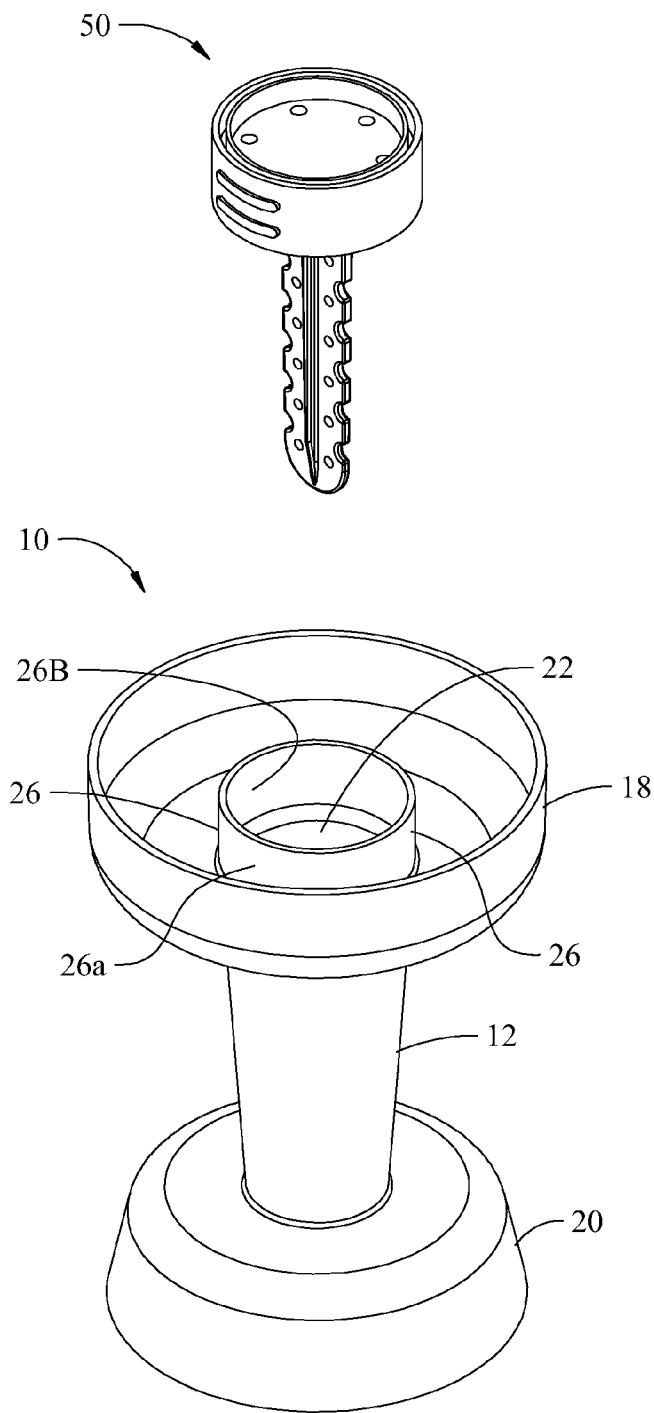
FIG. 10A is an exploded top-front perspective view of the holder described herein.
Figure 10B:
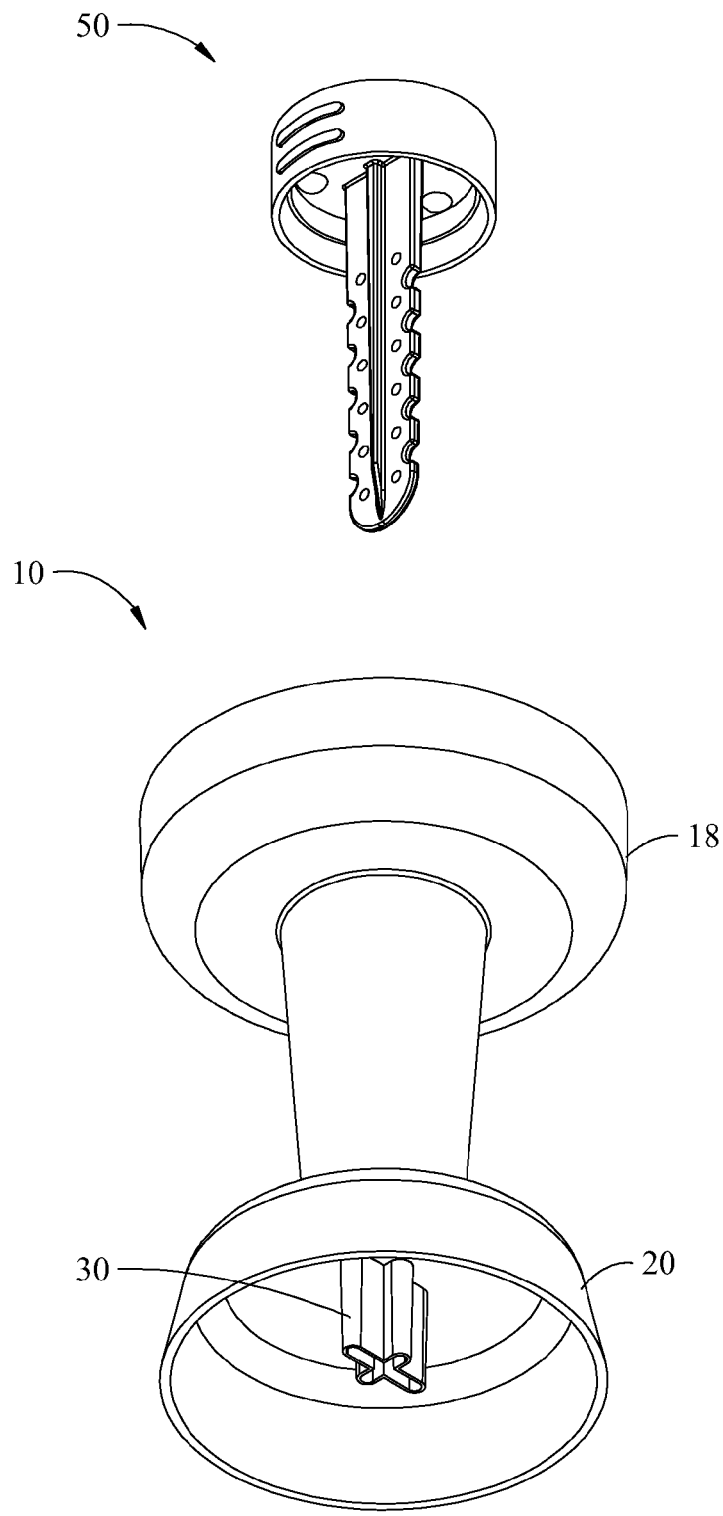
FIG. 10B is an exploded bottom front perspective view of the holder described herein.
Figure 11A:
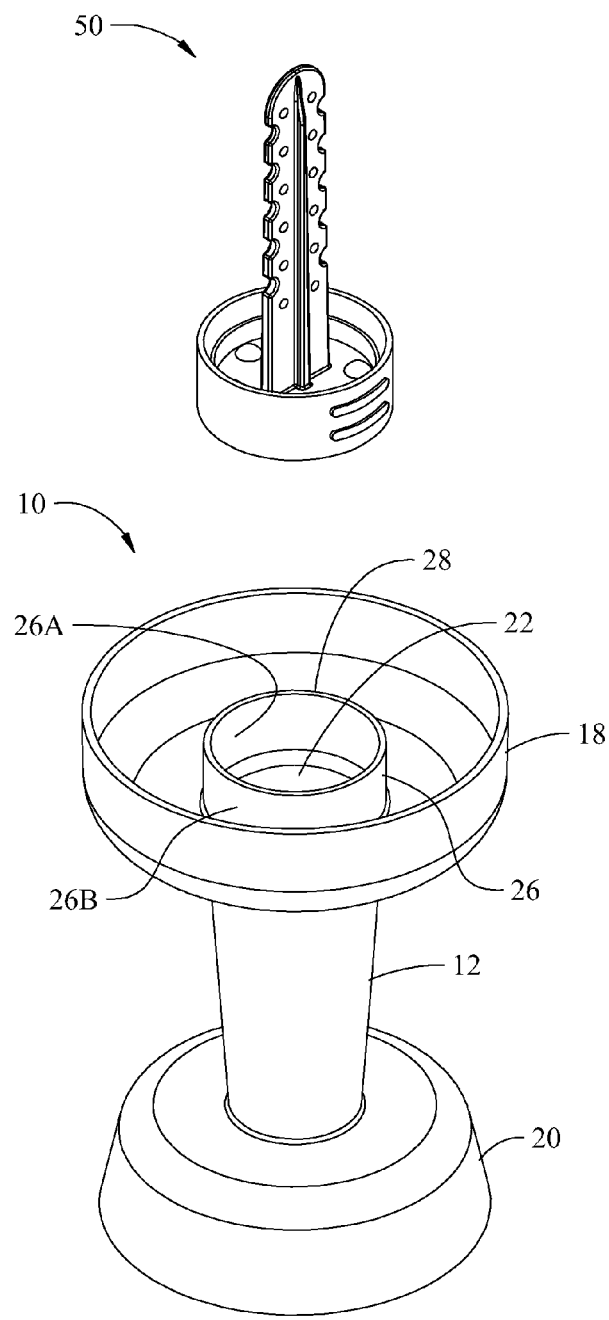
FIG. 11A is an exploded top-front perspective view of the holder described herein.
Figure 11B:
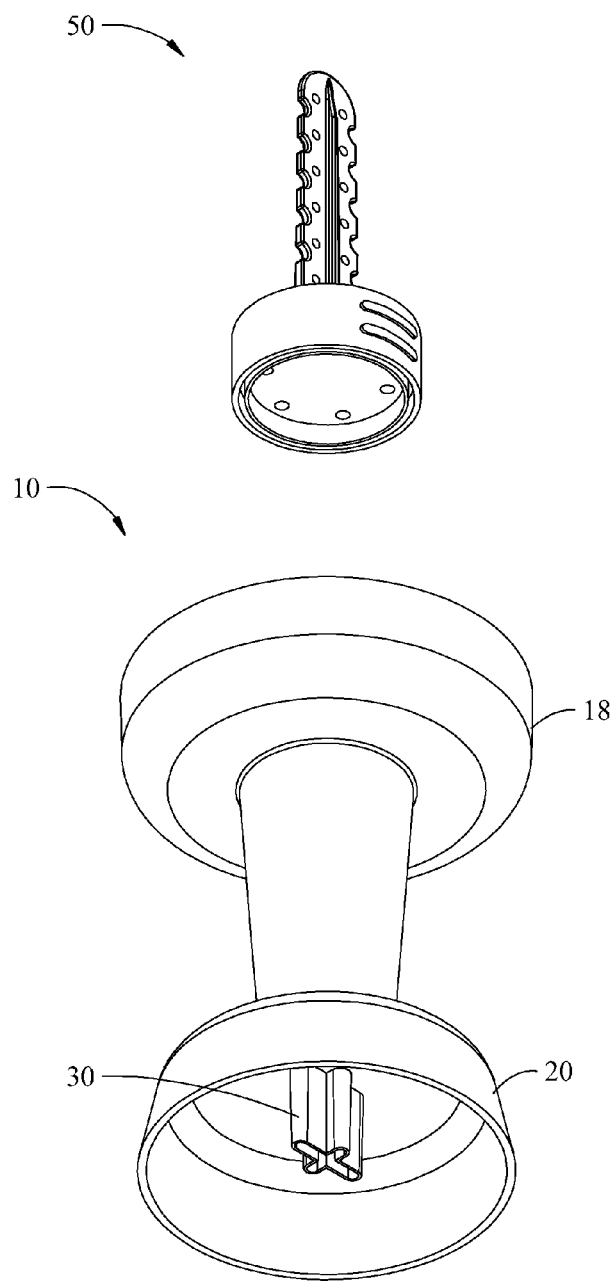
FIG. 11B is an exploded bottom-front perspective view of the holder described herein.

In one particular embodiment shown, for example, in FIGS. 2A, 2B, 4A, and 4B, the base portion 52 is mated to the upper portion 26 of the shaft 12. In one embodiment shown generally in FIGS. 7A, 7B, 9A, and 9B, the base portion 52 comprises inner and outer side walls 52A and 52B, and first and second bottom portions 52C and 52D, the first and second bottom portions 52C and 52D being at opposite ends of the base portion 52. In accordance with this embodiment, base portion 52 also includes first and second internal walls 54 and 56, also on opposite ends of the base portion 52. The first and second internal walls 54, 56 are positioned concentrically relative to the side walls 52A and 52B. The space between inner side wall 52A and first internal wall 54 forms groove 58 (FIGS. 7B and 9B). At the other end of the base portion 52, the space between inner side wall 52A and second internal wall 56 forms groove 60. Thus, upper portion 26 and ledge 28 mates or engages with groove 54 when cap 50 is in the first position (i.e., when stick portion 70 is housed within the chamber 24), and upper portion 26 and ledge 28 mates or engages with groove 56 when cap 50 is in the second position (i.e., when stick portion 70 is in the external or upright position).

In an alternative embodiment, the mounting cap 50 can be affixed or secured to the second receptacle in the second (i.e., extended or upright) position. Although not shown in the figures, the first bottom portion 52C of base 52 could optionally include a projection capable of mating or engaging with the large and or small slots 32A, 32B of projection 30. In still other embodiments, the mounting cap 50, the upper portion 26 of the shaft, and/or the projection 30 may be fitted with threads for screw-attachment of the mounting cap 50 to holder 10.

As shown in several figures, the stick portion 70 and a portion of the base portion 52 extends above the horizontal plane of the top edges of the first (or second) receptacle. This advantageously allows a user access (e.g., by mouth) to all or substantially all of the length of the meltable food product mounted on the cap.

As shown in FIGS. 1B, 2B, 4A, 4B, 8A-8D, 9A, and 9B, in certain embodiments the stick portion 70 optionally includes one or more, and preferably several, notches 72, giving the outer edges of stick portion a jagged appearance. In these and other embodiments, the stick portion 70 may include one or more, and preferably several channels or orifices 74 extending through the stick portion 70. It will be understood that the notches and/or orifices on the stick portion are not limited to the shape(s) shown in the figures; the notches may be more or less jagged and/or the orifices could have a circular, square, diamond, triangular, or other shape, or a combination of different shapes and patterns. In addition, one or more ridges 76 may be disposed on the stick portion. The notches 72 and channels 74 advantageously add stability to the meltable food product when formed on the stick portion. For example, in the case of a frozen confection or popsicle, the precursor substance (discussed below) can freeze in the channels 74 and in between the notches 72, supporting the frozen confection on the stick portion and preventing it from sliding off during removal from the chamber (also discussed below) or during consumption.

If desired, the holder 10 of any of the embodiments described herein may be manufactured by plastic injection molding to provide a holder of a variety of colors or color combinations, or provide a translucent holder, if desired.

Another aspect of the invention relates to a method of manufacturing a meltable food product using the holder described herein. In general, the chamber 24 functions as a forming container or mold for the meltable food product, and the mounting cap 50 is used to support the meltable food product once it is formed. The method involves filling the chamber 24 of the holder 10 with a meltable food product precursor substance, attaching the mounting cap 50 to the holder 10 in the first position described above (i.e., with the stick portion 70 housed within the chamber 24), cooling the precursor substance to form the meltable food product, and releasing the meltable food product from the chamber.

The meltable food product precursor substance for use in the methods described herein may be any suitable liquid or gel or frozen confection mix known in the art and capable of being formed or frozen in a mold. Specific examples include, but are not limited to, flavored water, fruit juices, coffee or other caffeinated beverages, alcoholic beverages, sodas, fruit pulps, yoghurt and other cultured products, flavored syrups, chocolate, ice creams, sherbets and sorbets, cake or cookie mixes or batter, combinations thereof, and the like. In addition, solid particles or granules such as nuts, cereals, granola, chocolate chips or chunks, candies, cookies or cookie pieces, cookie dough, or other solid or substantially solid edible matter can be added along with the precursor substance. It will be understood that the method is not limited to any particular precursor substance, particles, and combinations thereof, and virtually any edible material or substance may be employed to produce meltable food products having different or unique characteristics, tastes, and appearances.

In the cooling step, the holder 10, and particularly the precursor substance contained in the chamber 24, is cooled to a sufficiently low temperature to cause the precursor substance to harden or freeze within the chamber. In some cases, and depending on the precursor substance and/or any particles or granules included therewith, the holder and/or chamber will be cooled to a temperature that is below the freezing point of the precursor substance. Any of a variety of cooling methods may be employed including, for example, placing the holder 10 in a refrigerator or freezer, or immersing the holder in a tank containing a coolant liquid. In a preferred embodiment, the holder is placed in a freezer. It will be understood that the temperature and/or length of time of cooling may vary depending on the cooling method employed and/or the substance or substances being cooled. In various embodiments, for example, the holder 10 may be cooled for 0.5 hours, 1 hour, 2 hours, 4 hours, 6 hours, 8 hours, 10 hours, 12 hours, 18 hours, or 24 hours, or longer.

To release or remove the formed meltable food product from the chamber, it may be necessary to heat or warm all or a portion of the holder 10 in order to melt a portion of the substance adhered to the inside walls of the chamber 24. To this end, the holder can be removed from the freezer or other cooling device and left at room temperature for a sufficient period of time (e.g., 10 minutes or less, or even 5 minutes or less). Additionally or alternatively, heating packs or plates may be used, or the shaft 12 of the holder 10 may be contacted with water (e.g., by running the holder 10 or shaft 12 under warm or hot tap water). By way of another alternative, the shaft 12 may be grasped by a hand or hands of a user for a sufficient period of time (e.g., 1 minute to 10 minutes) to allow his or her body heat to melt any adhered product, thus allowing the product to be released and removed from the chamber.

Figure 12A:
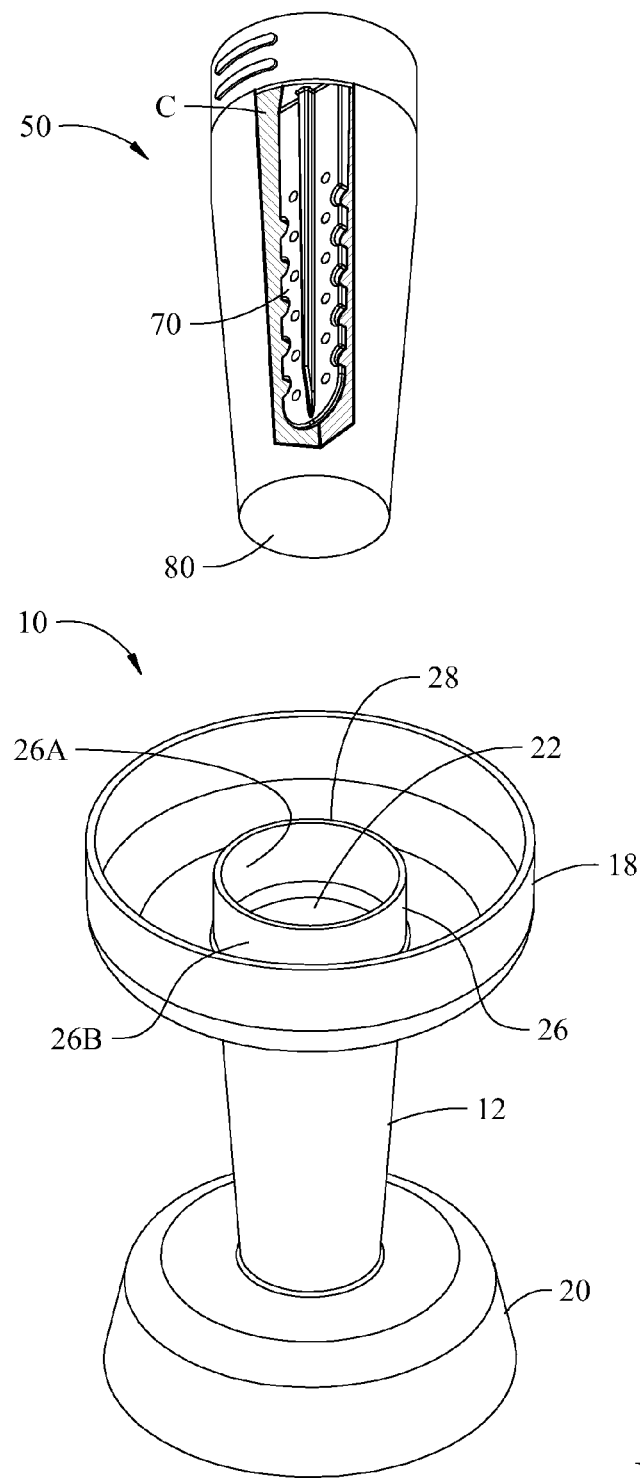
FIG. 12A is a top-front perspective view of the holder described herein showing a meltable food product mounted to the cap and removed from the chamber, with a cut-away portion to show the stick portion embedded in the meltable food product.
Figure 12B:
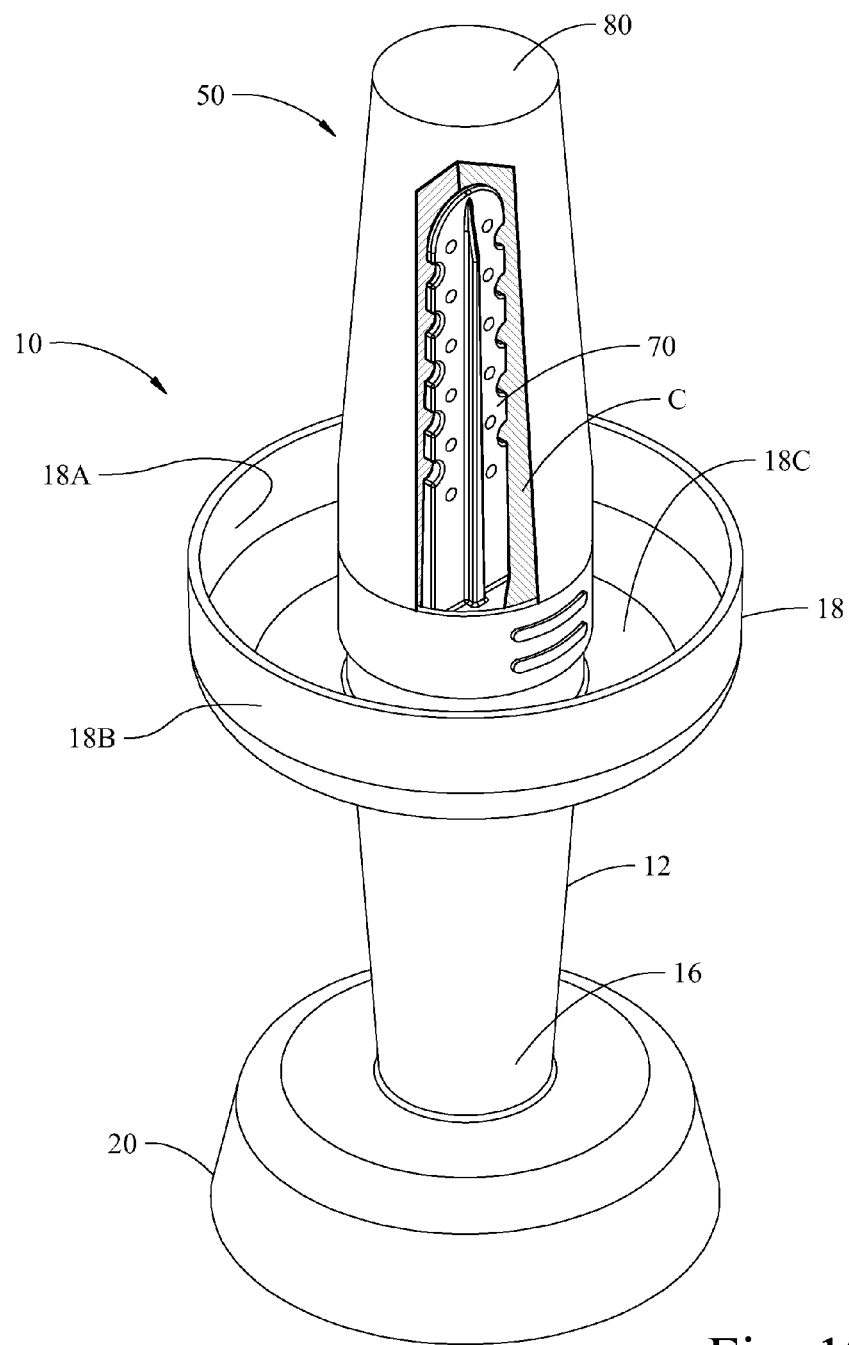
FIG. 12B is a top-front perspective view of the holder described herein with a meltable food product mounted to the cap with the cap shown in the second (external or upright) position and including a cut-away portion to show the stick portion embedded in the meltable food product.

As best seen in FIG. 4A, the stick portion 70 of the mounting cap 50 is positioned on the holder 10 such that the stick portion 70 is inserted into the chamber 24 so as to be at least partially, and preferably substantially, embedded in the precursor substance (not shown), while the base portion 52 of the cap seals or closes the opening 22 of the chamber 24 (e.g., by way of groove 58 and ledge 28) to prevent spillage (e.g., in the event that the holder 10 tips over before the precursor substance has an opportunity to freeze or solidify). The base portion 52 also advantageously acts as a handle when removing and releasing the mounted food product following the cooling step. Upon removal from the chamber 24, the cap 50 with the meltable food product mounted thereon may then be rotated vertically 180° and the base portion 52 attached to the first or second receptacle as described above (e.g., by way of groove 60 and ledge 28) for consumption of the meltable food product. This is generally depicted in FIGS. 12A and 12B, which show the holder 10 including a meltable food product 80 mounted to cap 50 being removed from the chamber 24 (FIG. 12A) and attached to the holder in the second (i.e., upright) position (FIG. 12B). Cut-away portion C is also provided to show the stick portion 70 embedded in the meltable food product 80.

Various features of the described invention have been shown and described in connection with the illustrated embodiments. However, it is to be understood that these features are presented herein as being illustrative of the subject invention, and that the scope of the invention is to be determined by the appended claims.

What is claimed is:

1. A holder for a meltable food product, the holder comprising:
    a grippable shaft having a first end and a second end, the shaft defining a chamber and including an opening into the chamber at the first end for receiving a cone supporting the meltable food product;

a first receptacle disposed at the first end of the shaft such that drips from the meltable food product supported on the cone will collect in the first receptacle;

a second receptacle disposed at the second end of the shaft, the second receptacle including a tubular portion for receiving a stick supporting the meltable food product such that drips from the meltable food product supported on the stick will collect in the second receptacle; and a meltable food product mounting cap including a base portion and a stick portion permanently affixed to the base portion, wherein the base portion attaches to the holder in a first position in which the base portion covers the opening to the chamber and the entire stick portion is housed within the chamber, or in a second position in which the base portion covers the opening to the chamber and the entire stick portion extends vertically away from a bottom portion of the first such that drips from the meltable food product supported on the stick portion will collect in the first and not in the chamber.

2. The holder of claim 1 wherein the base portion has a diameter $D_B$ and the stick portion has a width $W_{ST}$, with the ratio of $D_B$ to $W_{ST}$ being at least 2:1.

3. The holder of claim 1 wherein the first and second receptacles have diameter $D_R$ and the opening has a diameter $D_O$, with the ratio of $D_R$ to $D_O$ being at least 2:1.

4. The holder of claim 1 wherein the first and second receptacles have a depth $d_R$ and the mounting cap has a length $L_{MC}$, with the ratio of depth $d_R$ to length $L_{MC}$ being 0.1:1 to 0.3:1.

5. The holder of claim 1 wherein the stick portion includes a edge having one or more notches disposed in the edge.

6. The holder of claim 1 wherein the stick portion includes a surface having one or more channels extending through the stick portion.

7. The holder of claim 1 wherein the shaft and first and second receptacles are molded in a single piece from a moldable plastic and the mounting cap is molded as a separate piece from a moldable plastic.

8. A holder for a meltable food product, the holder comprising:

a grippable shaft having a first end and a second end, wherein the shaft defines a chamber and the first end includes an upper portion having an opening into the chamber for receiving a cone supporting the meltable food product;

a first receptacle having side walls and inner and outer bottom portions, wherein the first receptacle is disposed at the first end of the shaft with the upper portion of the first end extending through the inner and outer bottom portions of the first receptacle;

a second receptacle having side walls and inner and outer bottom portions, wherein the second receptacle is disposed at the second end of the shaft with the outer bottom portion of the second receptacle extending across a portion of the first end of the shaft opposite the opening in the upper portion of the first end of the shaft, and wherein the second receptacle includes a tubular portion for receiving a stick supporting the meltable food product; and a meltable food product mounting cap including a base portion and a stick portion permanently affixed to the base portion wherein the base portion attaches to the holder in a first position in which the base portion covers the opening to the chamber and the entire stick portion is housed within the chamber, or in a second position in which the base portion covers the opening to the chamber and the entire stick portion extends vertically away from a bottom portion of the first such that drips from the meltable food product supported on the stick portion will collect in the first and not in the chamber.

9. The holder of claim 8 wherein the base portion has a diameter $D_B$ and the stick portion has a width $W_{ST}$, with the ratio of $D_B$ to $W_{ST}$ being at least 2:1.

10. The holder of claim 8 wherein the first and second receptacles have diameter $D_R$ and the opening has a diameter $D_O$, with the ratio of $D_R$ to $D_O$ being at least 2:1.

11. The holder of claim 8 wherein the first and second receptacles have a depth $d_R$ and the mounting cap has a length $L_{MC}$, with the ratio of depth $d_R$ to length $L_{MC}$ being 0.1:1 to 0.3:1.

12. The holder of claim 8 wherein the stick portion includes an edge having one or more notches disposed in the edge.

13. The holder of claim 8 wherein the stick portion includes a surface having one or more channels extending through the stick portion.

14. The holder of claim 8 wherein the shaft and first and second receptacles are molded in a single piece from a moldable plastic and the mounting cap is molded as a separate piece from a moldable plastic.

15. A method of manufacturing a meltable food product, the method comprising filing the chamber of the holder of claim 1 or 8 with a meltable food product precursor substance, attaching the mounting cap to the holder in the first position, cooling the precursor substance to form the meltable food product, and releasing the meltable food product from the chamber.

* * * * *